(12) United States Patent
Hirschmann et al.

(10) Patent No.: US 10,723,948 B2
(45) Date of Patent: Jul. 28, 2020

(54) LIQUID CRYSTALLINE MEDIUM

(71) Applicant: MERCK PATENT GMBH, Darmstadt (DE)

(72) Inventors: Harald Hirschmann, Darmstadt (DE); Martina Windhorst, Muenster (DE); Christian Hock, Mainaschaff (DE); Andreas Pohle, Pfungstadt (DE); Axel Jansen, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 62 days.

(21) Appl. No.: 15/755,328

(22) PCT Filed: Jul. 28, 2016

(86) PCT No.: PCT/EP2016/001311
§ 371 (c)(1),
(2) Date: Feb. 26, 2018

(87) PCT Pub. No.: WO2017/032440
PCT Pub. Date: Mar. 2, 2017

(65) Prior Publication Data
US 2018/0244994 A1 Aug. 30, 2018

(30) Foreign Application Priority Data

Aug. 26, 2015 (EP) .................... 15002527

(51) Int. Cl.
| | | |
|---|---|---|
| G02F 1/1333 | (2006.01) | |
| C09K 19/20 | (2006.01) | |
| C09K 19/12 | (2006.01) | |
| C09K 19/44 | (2006.01) | |
| C09K 19/04 | (2006.01) | |
| C09K 19/30 | (2006.01) | |
| C09K 19/34 | (2006.01) | |
| G02F 1/1362 | (2006.01) | |

(52) U.S. Cl.
CPC .............. C09K 19/20 (2013.01); C09K 19/12 (2013.01); C09K 19/44 (2013.01); *C09K 2019/0455* (2013.01); *C09K 2019/0459* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/305* (2013.01); *C09K 2019/3009* (2013.01); *C09K 2019/3016* (2013.01); *C09K 2019/3025* (2013.01); *C09K 2019/3051* (2013.01); *C09K 2019/3422* (2013.01); *G02F 1/1362* (2013.01)

(58) Field of Classification Search
CPC ........ C09K 19/20; C09K 19/12; C09K 19/44; C09K 2019/0455; C09K 2019/0459; C09K 2019/0466; C09K 2019/122; C09K 2019/123; C09K 2019/3004; C09K 2019/3009; C09K 2019/301; C09K 2019/3016; C09K 2019/3025; C09K 2019/305; C09K 2019/3051; C09K 2019/3422; G02F 1/1333; G02F 1/1362
USPC ...................................... 252/299.63
See application file for complete search history.

(56) References Cited

U.S. PATENT DOCUMENTS

| | | | |
|---|---|---|---|
| 6,231,785 B1 | 5/2001 | Kondo | |
| 7,704,409 B2 * | 4/2010 | Haseba | ............. C09K 19/0275 |
| | | | 252/299.01 |
| 2011/0095228 A1 | 4/2011 | Saito | |
| 2012/0261616 A1 | 10/2012 | Czanta | |
| 2014/0034877 A1 * | 2/2014 | Fujita | ..................... C09K 19/20 |
| | | | 252/299.61 |
| 2014/0097384 A1 | 4/2014 | Wittek | |

FOREIGN PATENT DOCUMENTS

| | | |
|---|---|---|
| EP | 1739151 A1 | 1/2007 |
| EP | 2698414 A1 | 2/2014 |

OTHER PUBLICATIONS

International Search Report PCT/EP2016/001311 dated Oct. 11, 2016.

\* cited by examiner

*Primary Examiner* — Geraldina Visconti
(74) *Attorney, Agent, or Firm* — Millen White Zelano and Branigan, PC; Csaba Henter

(57) ABSTRACT

The invention relates to dielectrically positive liquid crystalline media comprising a compound of formula I

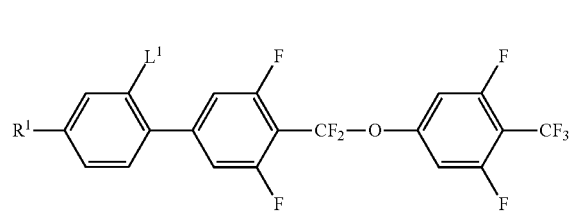

wherein the parameters have the meaning given in claim 1 and to liquid crystal displays comprising these media, especially to active matrix displays and in particular to TN and IPS mode displays.

18 Claims, No Drawings

LIQUID CRYSTALLINE MEDIUM

The present invention relates to liquid crystalline media and to liquid crystal displays comprising these media, especially to displays addressed by an active matrix and in particular to displays of the Twisted Nematic or the In Plane Switching (IPS) type.

Liquid Crystal Displays (LCDs) are widely used to display information. LCDs are used for direct view displays, as well as for projection type displays. Electro-optical modes employed are e.g. the twisted nematic (TN)-, the super twisted nematic (STN)-, the optically compensated bend (OCB)- and the electrically controlled birefringence (ECB)-mode with their various modifications, as well as others. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like e.g. the In-Plane Switching mode (as disclosed e.g. in DE 40 00 451 and EP 0 588 568). Especially this electro-optical mode is used for LCDs for modern desktop monitors and TV applications. The liquid crystals according to the present invention are preferably used in this type of displays.

For these displays new liquid crystalline media with improved properties are required. Especially the response times have to be improved for many types of applications. Thus liquid crystalline media with lower viscosities ($\eta$), especially with lower rotational viscosities ($\gamma_1$) are required. The rotational viscosity should be 80 MPa·s or less, preferably 70 MPa·s or less and especially 60 MPa·s or less. Besides this parameter, the media have to exhibit a suitably wide range of the nematic phase, an appropriate birefringence ($\Delta n$) and dielectric anisotropy ($\Delta \varepsilon$) should be high enough to allow a reasonably low operation voltage. Preferably $\Delta \varepsilon$ should be higher than 3 and very preferably higher than 4, preferably, however, not higher than 15 and in particular not higher than 12, as this would be detrimental for an at least reasonably high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials. These are e.g. polymer dispersed liquid crystal (PDLC)-, nematic curvilinearly aligned phase (NCAP)- and polymer network (PN)-systems, as disclosed for example in WO 91/05 029 or axially symmetric microdomain (ASM) systems and others. In contrast to these, the modes especially preferred according to the instant invention are using the liquid crystal medium as such, oriented on surfaces. These surfaces typically are pre-treated to achieve uniform alignment of the liquid crystal material The display modes according to the instant invention preferably use an electrical field substantially parallel to the composite layer.

Liquid crystal compositions suitable for LCDs and especially for IPS displays are known e.g. from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them, amongst other deficiencies, lead to unfavourably long response times, have too low values of the resistivity and/or require operation voltages, which are too high.

Thus, there is a significant need for liquid crystalline media with suitable properties for practical applications such as a wide nematic phase range, appropriate optical anisotropy $\Delta n$, according to the display mode used, a high $\Delta \varepsilon$ and especially low viscosities.

Surprisingly, it has now been found that liquid crystalline media with a suitably high $\Delta \varepsilon$, a suitable phase range, and $\Delta n$ can be realized which do not exhibit the drawbacks of the materials of the prior art or at least do exhibit them to a significantly lesser degree by using liquid crystalline media comprising one or more compounds of formula I below.

Hence, the present invention relates to a liquid crystal medium comprising
one or more compounds of formula I

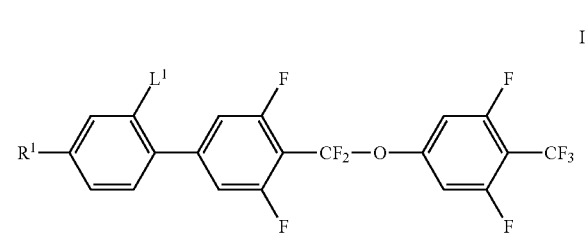

wherein
$R^1$ denotes alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, preferably alkyl or alkenyl,
$L^1$ denotes H or F
optionally, one or more compounds selected from the group of compounds of formulae II and III

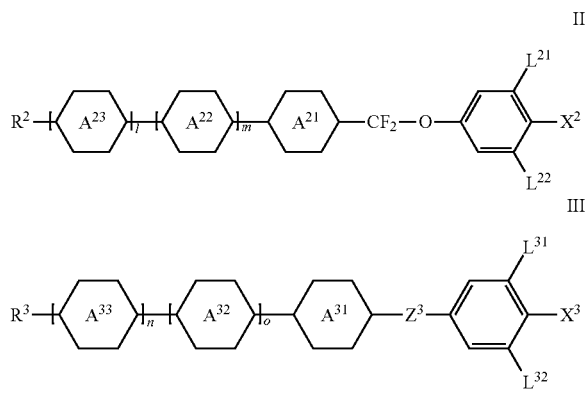

wherein
$R^2$ and $R^3$ independently of each other, denote alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, preferably alkyl or alkenyl,

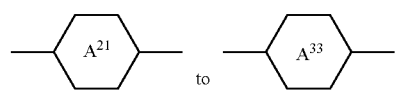

are independently of each other

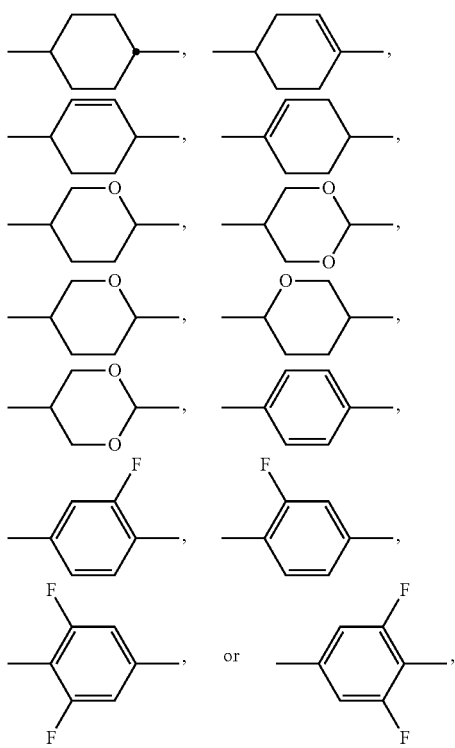

preferably

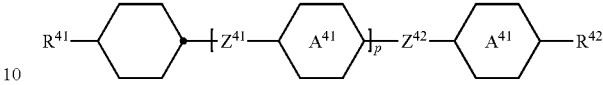

$L^{21}$, $L^{22}$, $L^{31}$ and $L^{32}$ independently of each other, denote H or F, preferably F
$X^2$ and $X^3$ independently of each other, denote halogen, halogenated alkyl or alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$,
$Z^3$ denotes —CH$_2$CH$_2$—, —CF$_2$CF$_2$—, —COO—, trans-—CH═CH—, trans-CF═CF—, —CH$_2$O— or a single bond, preferably —CH$_2$CH$_2$—, —COO—, trans-—CH═CH— or a single bond and most preferably —COO—, trans-—CH═CH— or a single bond, and l, m, n and o are, independently of each other, 0 or 1 and from which compounds of formula I are excluded, and optionally one or more compounds of formula IV

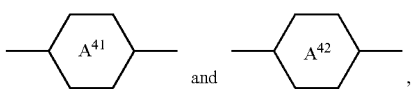

wherein
$R^{41}$ and $R^{42}$ independently of each other have the meaning given for $R^2$ under formula II above, preferably $R^{41}$ is alkyl and $R^{42}$ is alkyl or alkoxy or $R^{41}$ is alkenyl and $R^{42}$ is alkyl,

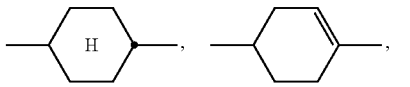

independently of each other, and in case

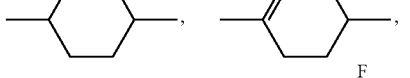

is present twice, also these, independently of each other, are

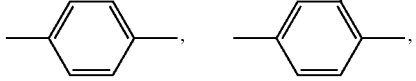
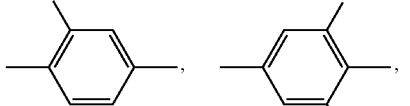
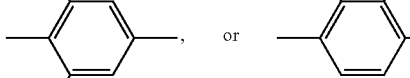

preferably at least one of

is

$Z^{41}$, $Z^{42}$ independently of each other, and in case $Z^{41}$ is present twice, also these independently of each other, denote —CH$_2$CH$_2$—, —COO—, trans-—CH=CH—, trans-—CF=CF—, —CH$_2$O—, —CF$_2$O—, —C≡C— or a single bond, preferably at least one of them is a single bond, and p is 0, 1 or 2, preferably 0 or 1.

The compounds of formula II are preferably selected from the group of compounds of formulae II-1 to II-3

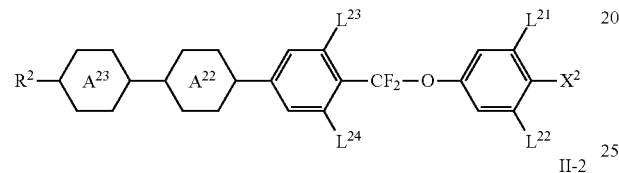

II-1

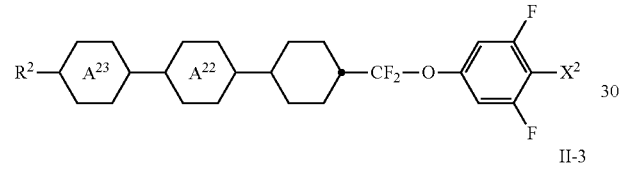

II-2

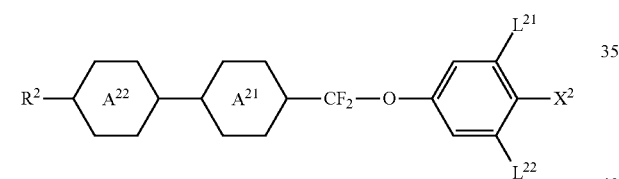

II-3 wherein the parameters have the respective meanings given under formula II above and in formula II-1 the parameters $L^{23}$ and $L^{24}$ denote, independently of each other and of the other parameters, H or F and in formula II-2 preferably

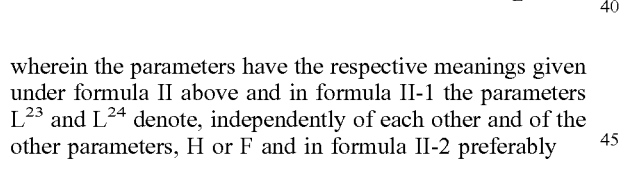

and denote independently of each other

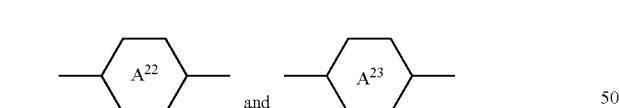

or

.

In formulae II-1 to II-3, $L^{21}$ and $L^{22}$ or $L^{23}$ and $L^{24}$ are preferably both F.

In another preferred embodiment in formulae II-1 and II-2, all of $L^{21}$, $L^{22}$, $L^{23}$ and $L^{24}$ denote F.

The compounds of formula II-1 are selected from the group of compounds of formulae II-1a to II-1g

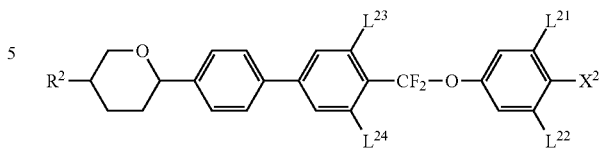

II-1a

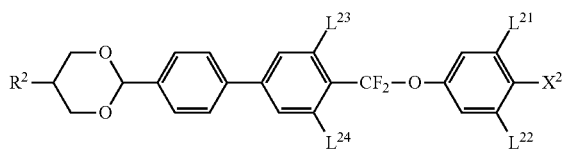

II-1b

II-1c

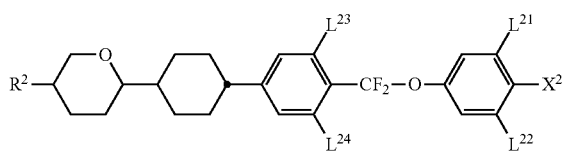

II-1d

II-1e

II-1f

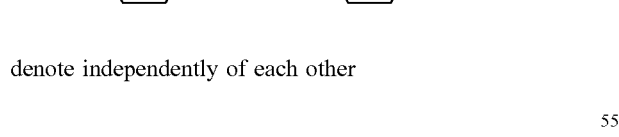

II-1g

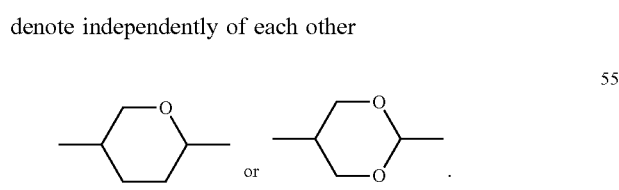

wherein the parameters have the respective meanings given above.

In a preferred embodiment of the present invention the medium comprises compounds selected from the group of compounds of formulae II-1a to II-1g wherein $L^{21}$ and $L^{22}$ or $L^{23}$ and $L^{24}$ are both F.

In another preferred embodiment the medium comprises compounds selected from the group of compounds of formulae II-1a to II-1g, wherein $L^{21}$, $L^{22}$, $L^{23}$ and $L^{24}$ all are F.

Especially preferred compounds of formula II-1 are

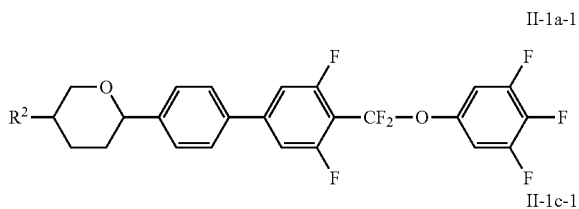
II-1a-1

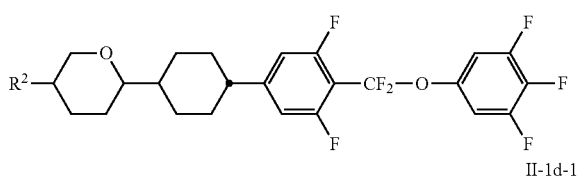
II-1c-1

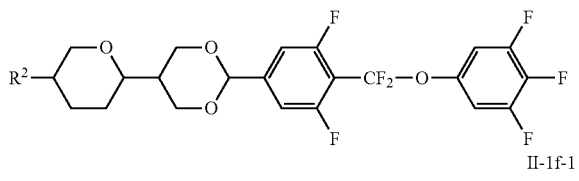
II-1d-1

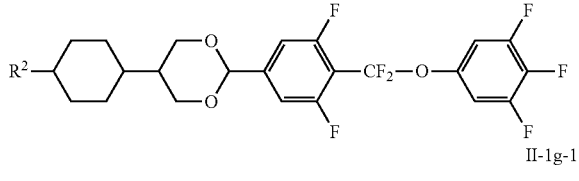
II-1f-1

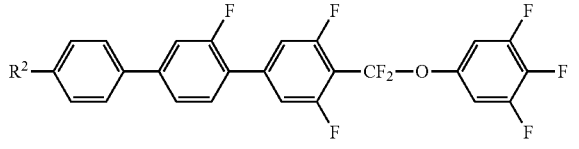
II-1g-1 wherein the $R^2$ has the meaning given above.

Preferably the compounds of formula II-2 are selected from the group of compounds of formulae II-2a to II-2c

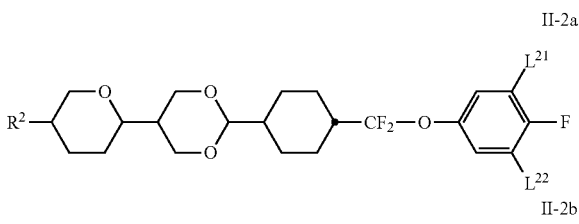
II-2a

II-2b

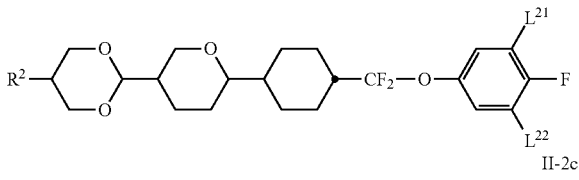

II-2c

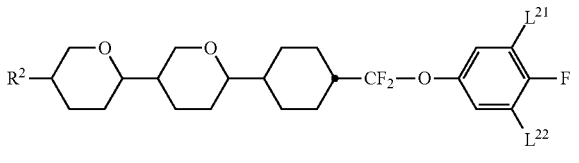

wherein the parameters have the respective meanings given above and preferably $L^{21}$ and $L^{22}$ are both F.

Preferably the compounds of formula II-3 are selected from the group of compounds of formulae II-3a to II-3e

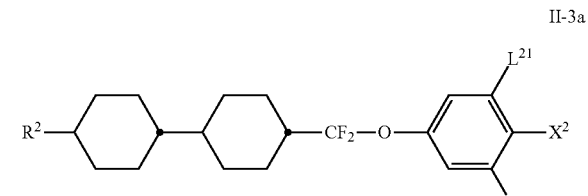
II-3a

II-3b

II-3c

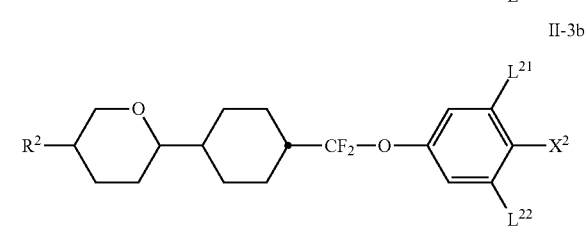
II-3d

II-3e

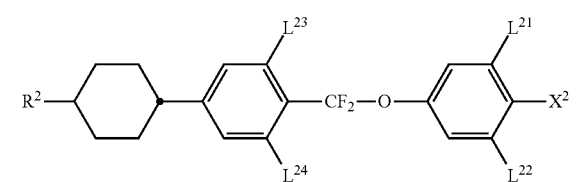

wherein the parameters have the respective meanings given above and preferably $L^{21}$ and $L^{22}$ are both F and $L^{23}$ and $L^{24}$ are both H or $L^{21}$, $L^{22}$, $L^{23}$ and $L^{24}$ are all F.

Especially preferred compounds of formula II-3 are

II-3a-1

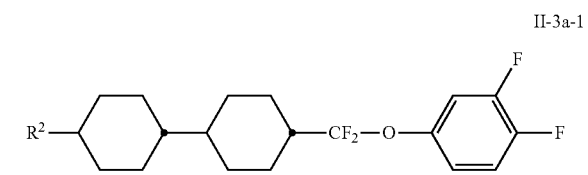

II-3a-2

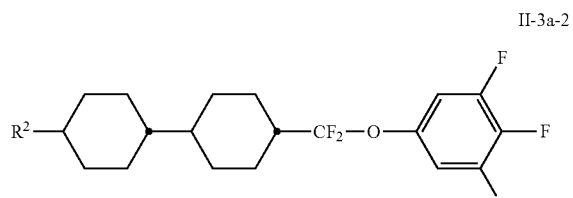

II-3b-1

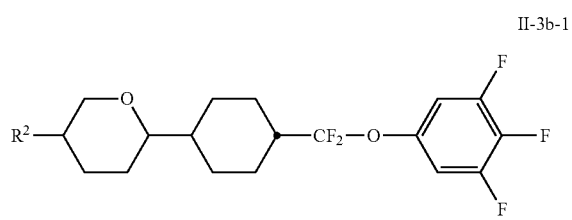

II-3d-1

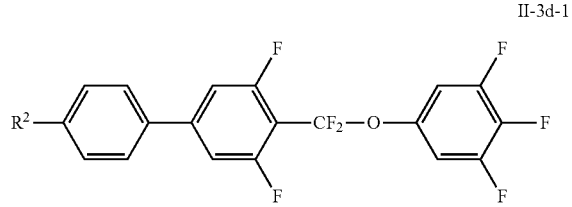

II-3e-1

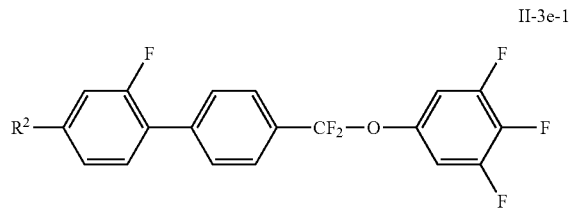

wherein the R² has the meaning given above.

In another preferred embodiment of the present invention compounds of formula III are selected from the group of formulae III-1 and III-2

III-1

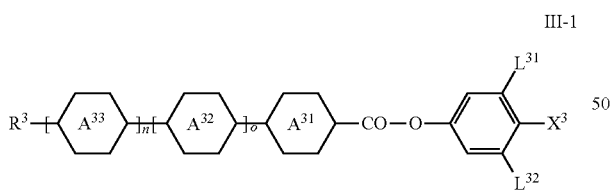

III-2

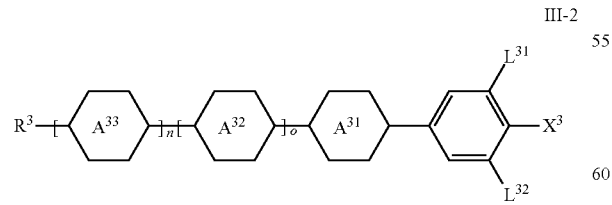

wherein the parameters have the respective meanings given under formula III above.

Preferably the compounds of formula III-1 are selected from the group of compounds of formulae III-1a and III-1b III-1a

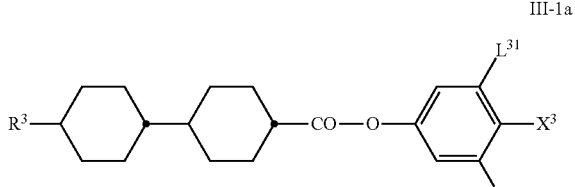

III-1b

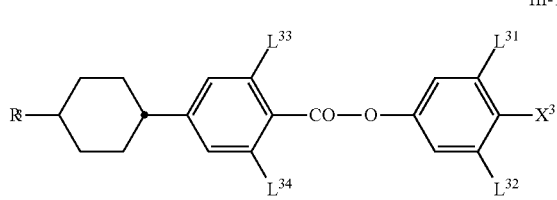

wherein the parameters have the respective meanings given above and the parameters $L^{33}$ and $L^{34}$, independently of each other and of the other parameters, denote H or F.

Preferably the compounds of formula III-2 are selected from the group of compounds of formulae III-2a to III-2i III-2a

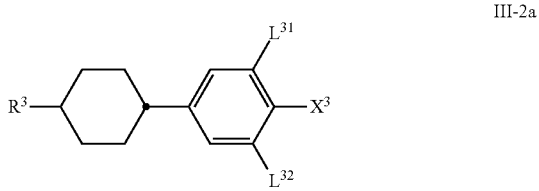

III-2b

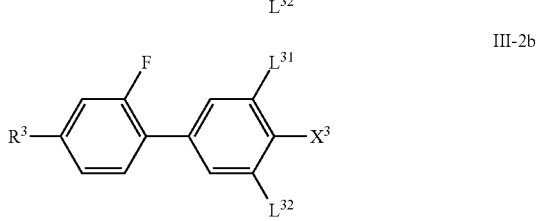

III-2c

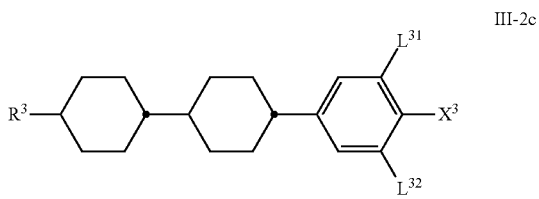

III-2d

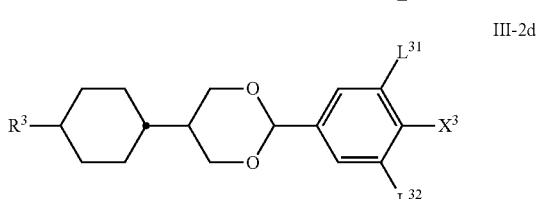

III-2e

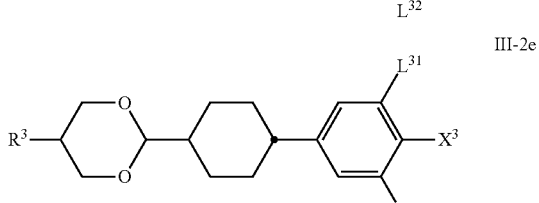

III-2f
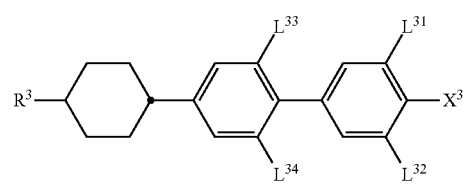

III-2g
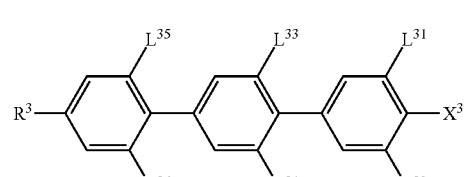

III-2h
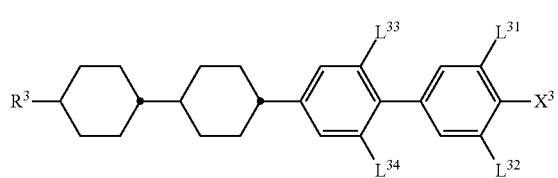

III-2i
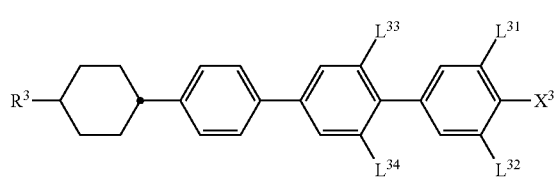

wherein the parameters have the respective meanings given above and $L^{35}$ and $L^{36}$, independently of one another, denote H or F.

The compounds of formula III-1a, are preferably selected from the group of compounds of formulae III-1a-1 to III-1a-6

III-1a-1
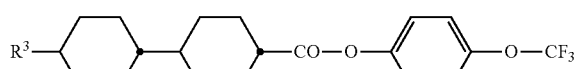

III-1a-2

III-1a-3
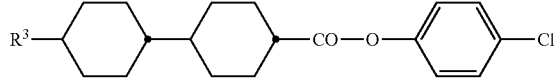

III-1a-4
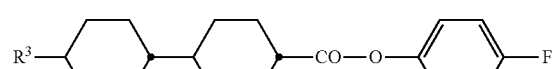

III-1a-5
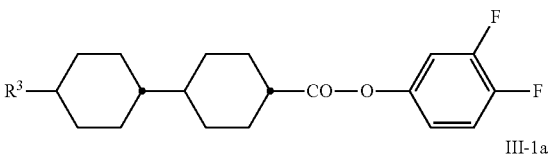

III-1a-6
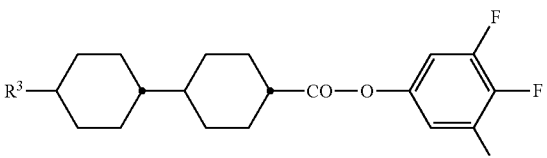

wherein the $R^3$ has the meaning given above.

In another preferred embodiment the compounds of formula II-2a are selected from the group of compounds of formulae III-2a-1 to III-2a-4

III-2a-1
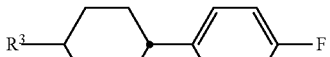

III-2a-2

III-2a-3

III-2a-4
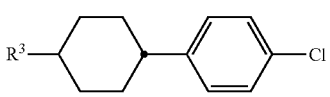

wherein the $R^3$ has the meaning given above.

The compounds of formula III-2b are preferably selected from the group of compounds of formulae III-2b-1 and III-2b-2, preferably III-2b-2

III-2b-1

III-2b-2
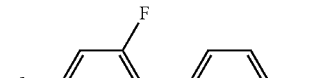

wherein the $R^3$ has the meaning given above.

The compounds of formula II-2c, are preferably selected from the group of compounds of formulae III-2c-1 to III-2c-5

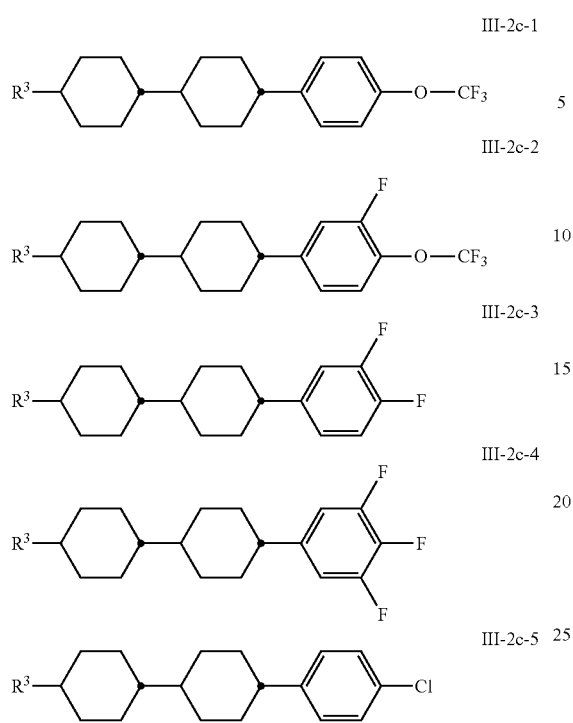

wherein the R³ has the meaning given above.

The compounds of formulae III-2d and III-2e are preferably selected from the group of compounds of formulae III-2d-1 and III-2e-1

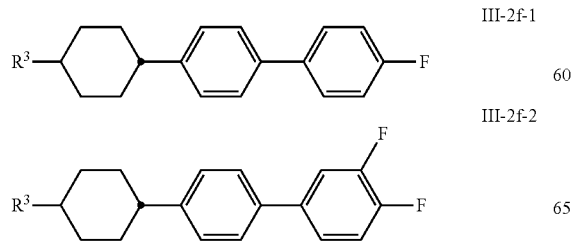

wherein the R³ has the meaning given above.

The compounds of formula III-2f are preferably selected from the group of compounds of formulae III-2f-1 to III-2f-7

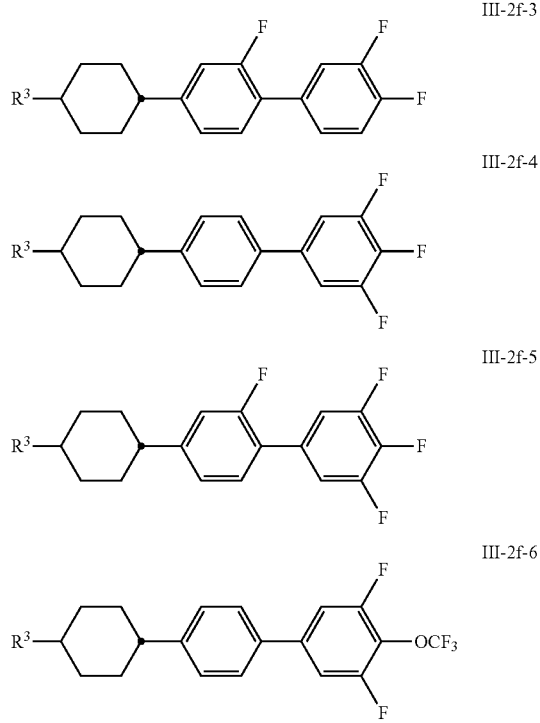

wherein the R³ has the meaning given above.

The compounds of formula III-2g, are preferably selected from the group of compounds of formulae III-2g-1 to III-2g-5

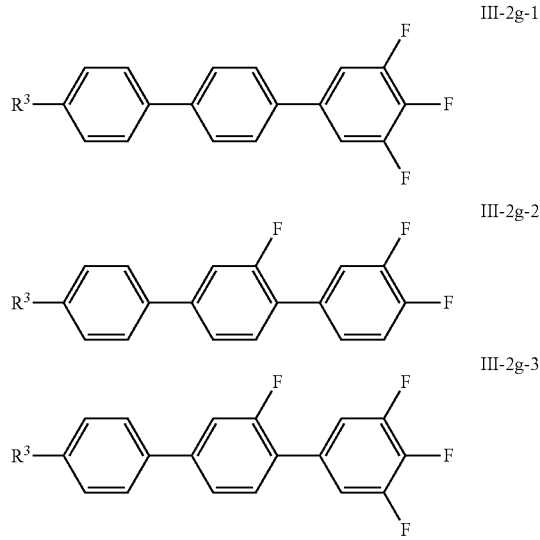

III-2g-4
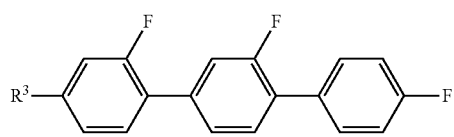

III-2g-5
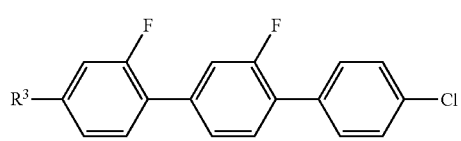

wherein the R³ has the meaning given above.

The compounds of formula III-2h are preferably selected from the group of compounds of formulae III-2h-1 to III-2h-3

III-2h-1

III-2h-2

III-2h-3
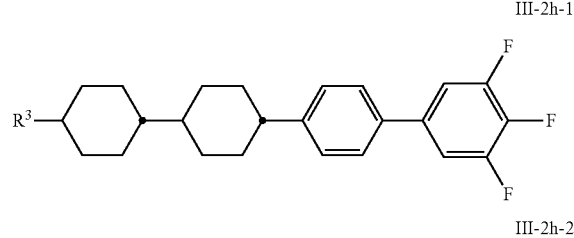

wherein the R³ has the meaning given above.

The compounds of formula III-2i are preferably selected from the group of compounds of formulae III-2i-1 to III-2i-6

III-2i-1

III-2i-2
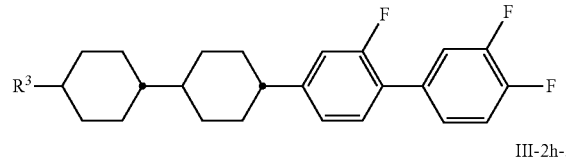

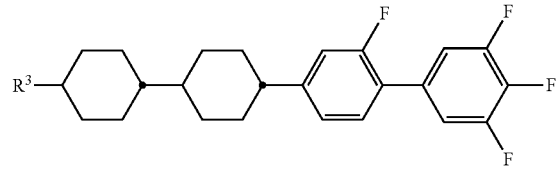

III-2i-3

III-2i-4

III-2i-5

III-2i-6
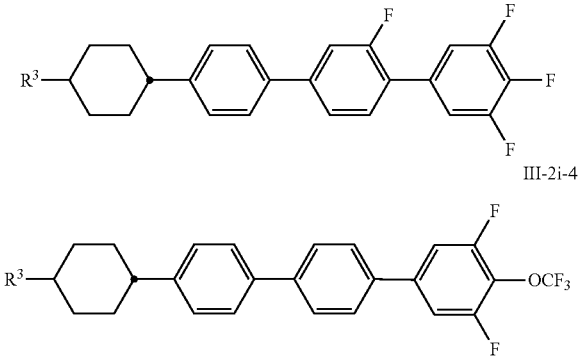

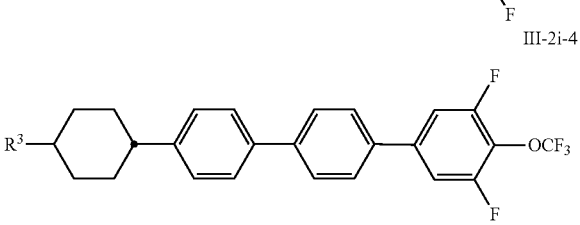

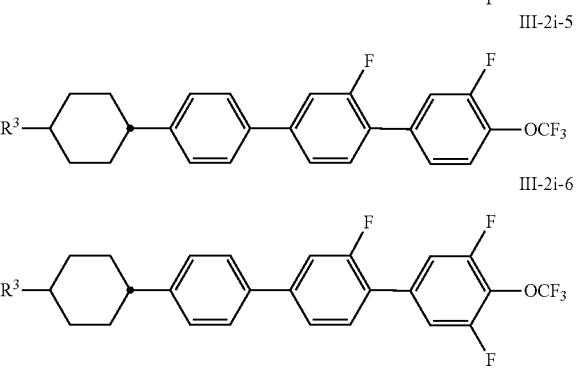

wherein the R³ has the meaning given above.

Alternatively or additionally to compounds of formulae III-1 and/or III-2 the media according to the present invention may comprise one or more compounds of formula III-3, III-3
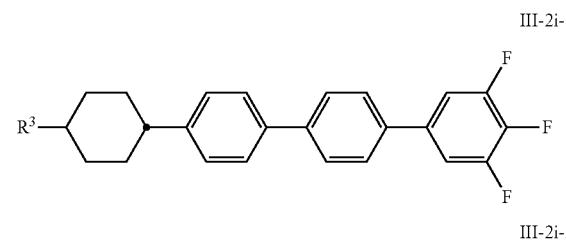

wherein the parameters have the respective meanings given under formula III above,
and preferably of formula III-3a III-3a
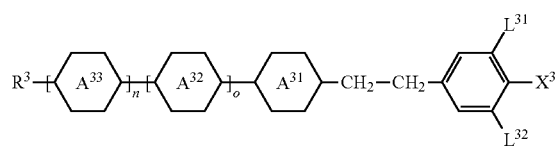

wherein the R³ has the meaning given above.

Preferably the liquid crystalline media according to the present invention comprise one or more compounds of formula IV preferably selected from the group of compounds of formulae IV-1 to IV-5

IV-1

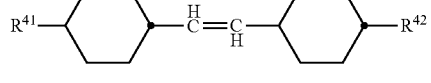
IV-2

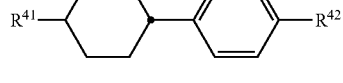
IV-3

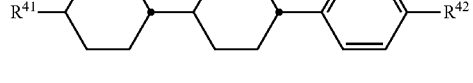
IV-4

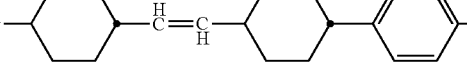
IV-5 wherein $R^{41}$ and $R^{42}$ have the respective meanings given under formula IV above and in formulae IV-1, IV-4 and IV-5 $R^{41}$ preferably is alkyl or alkenyl, preferably alkenyl and $R^{42}$ preferably is alkyl or alkenyl, preferably alkyl; in formula IV-2 $R^{41}$ and $R^{42}$ preferably are alkyl and in formula IV-3 $R^{41}$ preferably is alkyl or alkenyl, preferably alkyl and $R^{42}$ preferably is alkyl or alkoxy, preferably alkoxy.

In a preferred embodiment, the medium comprises one or more compounds of formula IV-1, more preferably selected from its respective subformulae of formula CC-n-V and/or CC-nV-m, more preferably of formula CC-n-V and most preferably of formula CC-3-V. The definitions of these abbreviations (acronyms) are given in table B below.

In a preferred embodiment, the medium comprises one or more compounds of formula IV-4, more preferably selected from its respective subformulae of formula CCP-V-n and/or CCP-nV-m and/or CCP-Vn-m, more preferably of formula CCP-V-n and/or CCP-V2-n and most preferably selected from the group of formulae CCP-V-1 and CCP-V2-1. The definitions of these abbreviations (acronyms) are given in table B below.

Preferably the medium comprises compounds selected from the group of compounds of formulae IV-1, IV-3, IV-4 and IV-5, preferably one or more compounds of formula IV-1 and one or more compounds selected from the group of formulae IV-3 or IV-4.

Optionally it can be preferred that the medium further comprises one or more compounds of formula IV selected from the group of compounds of formulae IV-6 to IV-13

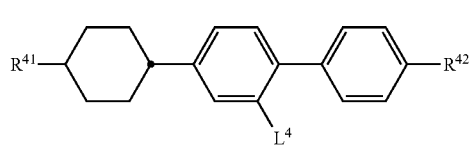
IV-6

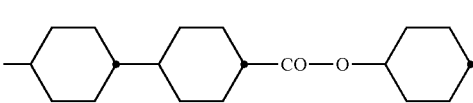
IV-7

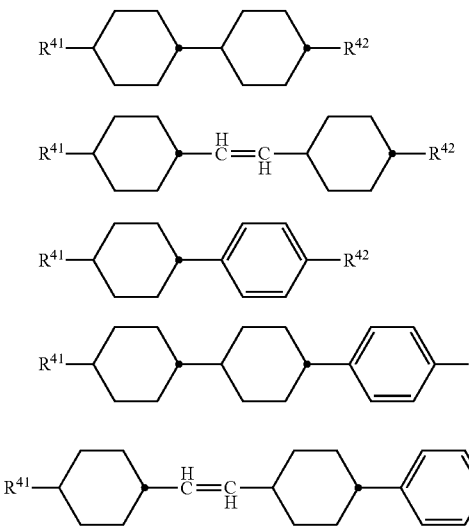

IV-8, IV-9, IV-10, IV-11, IV-12, IV-13 wherein $R^{41}$ and $R^{42}$ independently of each other, denote alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and $L^4$ denotes H or F.

Alternatively or additionally to compounds of formulae II and/or III the media according to the present invention my comprise one or more compounds of formula V

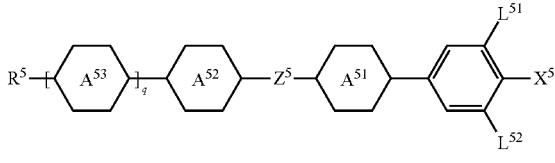
V wherein $R^5$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and preferably is alkyl or alkenyl,

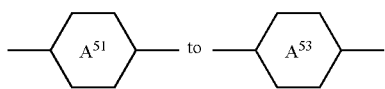

are, independently of each other,

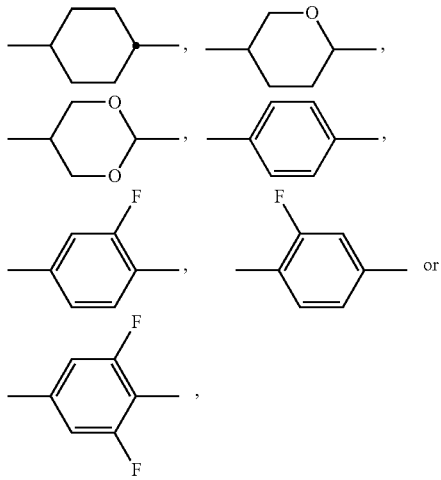

$L^{51}$ and $L^{52}$, independently of each other, denote H or F, preferably $L^{51}$ denotes F and $X^5$ denotes halogen, halogenated alkyl or alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$, $Z^5$ denotes —CH$_2$CH$_2$—, —CF$_2$CF$_2$—, —COO—, trans-—CH═CH—, trans-—CF═CF— or —CH$_2$O, preferably —CH$_2$CH$_2$—, —COO— or trans-—CH═CH— and most preferably —COO— or —CH$_2$CH$_2$—, and q is 0 or 1.

Preferably the media according to the present invention comprises one or more compounds of formula V, preferably selected from the group of compounds of formulae V-1 and V-2

V-1

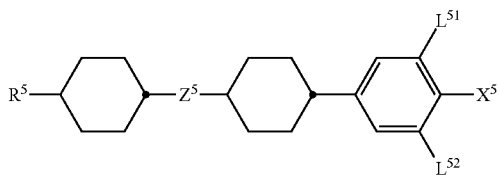

V-2

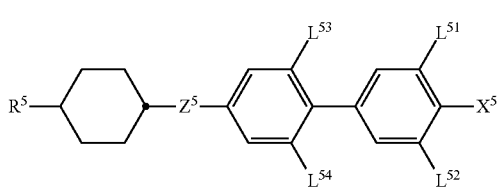

wherein the parameters have the respective meanings given above and the parameters $L^{53}$ and $L^{54}$ are, independently of each other and of the other parameters, H or F and preferably $Z^5$ is —CH$_2$—CH$_2$—.

Preferably the compounds of formula V-1 are selected from the group of compounds of formulae V-1a and V-1b V-1a

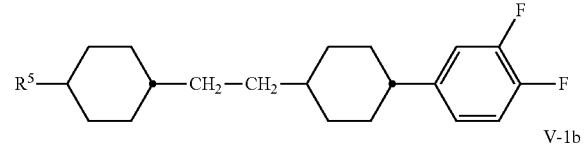

V-1b

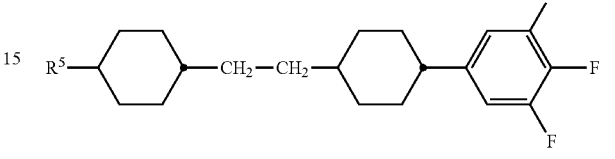

wherein the $R^5$ has the meaning given above.

Preferably the compounds of formula V-2 are selected from the group of compounds of formulae V-2a to V-2d V-2a V-2b

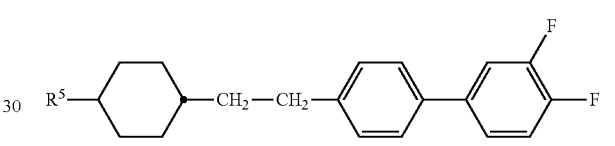

V-2c

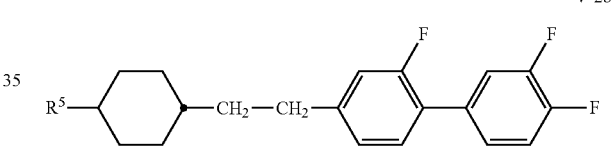

V-2d

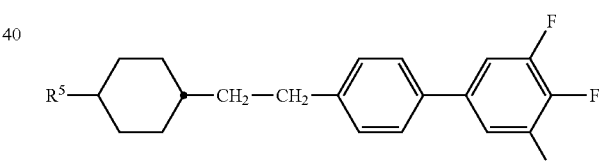

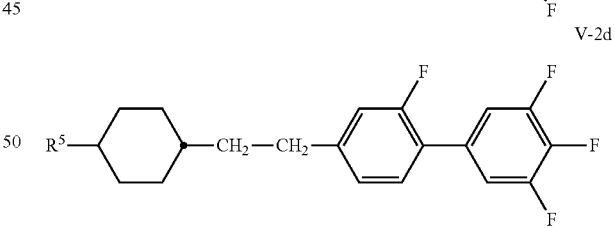

wherein the $R^5$ has the meaning given above.

Preferably the liquid crystalline media according to the present invention additionally comprise one or more compounds of formula VI

VI

wherein

R$^{61}$ and R$^{62}$ independently of each other have the meaning given for R$^2$ under formula II above, preferably R$^{61}$ is alkyl and R$^{62}$ is alkyl or alkenyl,

in each occurrence independently of each other, denote to

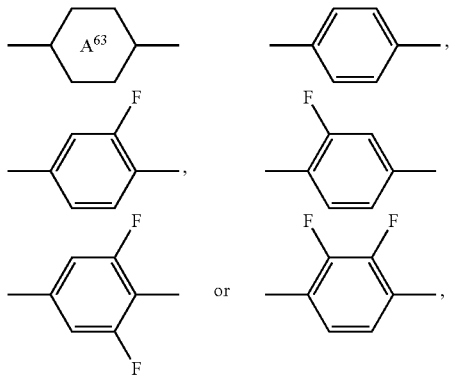

Z$^{61}$ and Z$^{62}$ are, independently of each other, and in case Z$^{61}$ is present twice, also these independently of each other, —CH$_2$CH$_2$—, —COO—, trans-—CH═CH—, trans-—CF═CF—, —CH$_2$O—, —CF$_2$O— or a single bond, preferably at least one of them is a single bond, and r is 0, 1 or 2, preferably 0 or 1.

Preferably the compounds of formula VI are selected from the group of compounds of formulae VI-1 to VI-4

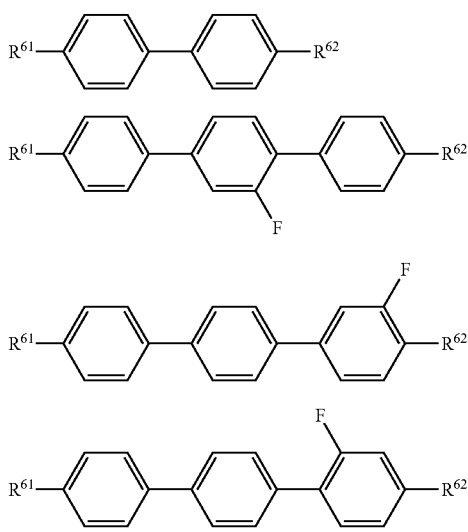

wherein R$^{61}$ and R$^{62}$ have the respective meanings given under formula VI above and R$^{61}$ preferably is alkyl and in formula VI-1 R$^{62}$ preferably is alkenyl, preferably —(CH$_2$)$_2$—CH═CH—CH$_3$ and in formula VI-2 R$^{62}$ preferably is alkenyl, preferably —(CH$_2$)$_2$—CH═CH$_2$ and in formulae VI-3 and VI-4 R$^{62}$ preferably is alkyl.

Preferably the medium comprises one or more compounds selected from the group of compounds of formulae VI-1 to VI-4 wherein R$^{61}$ preferably is alkyl and in formula VI-1 R$^{62}$ preferably is alkenyl, preferably —(CH$_2$)$_2$—CH═CH—CH$_3$ and in formula VI-2 R$^{62}$ preferably is alkenyl, preferably —(CH$_2$)$_2$—CH═CH$_2$ and in formulae VI-3 and VI-4 R$^{62}$ preferably is alkyl.

The compounds of formula VI-1 are preferably selected from its subformula PP-n-2Vm, more preferably of formula PP-1-2V1. The definitions of these abbreviations (acronyms) are given in table B below.

In a preferred embodiment, the medium comprises one or more compounds of formula VI-2, more preferably of its subformula PGP-n-m, more preferably of its subformulae PGP-2-m and PGP-3-m, more preferably selected from of formulae PGP-2-2V, PGP-3-2, PGP-3-3, PGP-3-4, PGP-3-5.

The definitions of these abbreviations (acronyms) are given in table B below.

Medium

Preferably the liquid crystalline media according to the instant invention comprise one or more compounds of formula I, II, III and IV.

Also other mesogenic compounds, which are not explicitly mentioned above, can optionally and beneficially be used in the media according to the instant invention. Such compounds are known to the expert in the field.

The Δn, at 589 nm (Na$^D$) and 20° C., of the liquid crystal media according to the instant invention preferably is in the range of 0.070 or more to 0.145 or less, more preferably in the range of 0.080 or more to 0.140 or less and most preferably in the range of 0.090 or more to 0.135 or less.

The Δε, at 1 kHz and 20° C., of the liquid crystal medium according to the invention preferably is 4 or more, more preferably 6 or more and most preferably 8 or more. In particular Δε is 14 or less.

Preferably the nematic phase of the inventive media extends at least from 0° C. or less to 70° C. more, more preferably at least from −20° C. or less to 70° C. more, most preferably at least from −30° C. or less to 75° C. more and in particular at least from −40° C. or less to 75° C. more.

In a first preferred embodiment of the present invention the Δn of the liquid crystal media is in the range of 0.120 or more to 0.150 or less, more preferably in the range of 0.125 or more to 0.145 or less and most preferably in the range of 0.130 or more to 0.140 or less, while Δε preferably is in the range from 3 or more to 12 or less, preferably 10 or less.

In a second preferred embodiment of the present invention the Δn of the liquid crystal media is n the range of 0.120 or more to 0.150 or less, more preferably in the range of 0.125 or more to 0.145 or less and most preferably in the range of 0.130 or more to 0.140 or less, while Δε preferably is in the range from 2 or more to 8 or less, preferably 6 or less.

In a third preferred embodiment of the present invention the Δn of the liquid crystal media is n the range of 0.085 or more to 0.130 or less, more preferably in the range of 0.090 or more to 0.125 or less and most preferably in the range of 0.095 or more to 0.120 or less, while Δε preferably is 6 or more, more preferably 8 or more, even more preferably 11 or more and most preferably in the range from 11 or more to 14 or less.

In a fourth preferred embodiment of the present invention the Δn of the liquid crystal media is n the range of 0.090 or more to 0.135 or less, more preferably in the range of 0.095 or more to 0.130 or less and most preferably in the range of 0.110 or more to 0.125 or less, while Δε preferably is 6 or more, more preferably 8 or more, even more preferably 11 or more and most preferably in the range from 11 or more to 14 or less.

The concentration of compounds of formula I in the medium preferably is in the range from 1% to 20%, more preferably from 2% to 17% and most preferably from 4% to 15%.

The total concentration of compounds of formulae II and III in the medium preferably is in the range from 5% to 65%, more preferably from 10% to 60% and most preferably from 13% to 50%.

The total concentration of compounds of the formulae I, II and III in total preferably is in the range from from 10% to 80%, more preferably from 15% to 70% and most preferably from 18% to 65%

The total concentration of compounds of formula IV preferably is in the range from 30% to 70%, more preferably from 35% to 60% and most preferably from 40% to 55%.

The total concentration of compounds of formula V is in the range from 0% to 35%, more preferably from 1% to 30% and most preferably from 5% to 30%.

The concentration of compounds of formula VI is in the range from 0 to 40%, preferably 2 to 35% and most preferably 5 to 30%.

Optionally, the inventive media can comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

In a preferred embodiment the medium comprises one or more compounds of formula IV, more preferably of formula IV-1, more preferably selected from its respective subformulae of formula CC-n-V and/or CC-n-Vm, more preferably of formula CC-n-V1 and/or CC-n-V and most preferably selected from the group of formulae CC-3-V, CC-4-V, CC-S-V and CC-3-V1.

In a preferred embodiment the medium comprises one or more compounds of formula II-1, preferably of formulae II-1a and III-g, more preferably of formula II-1-g-1, preferably selected from its respective subformulae of formula PGUQU-n-F, most preferably selected from the group of formulae PGUQU-3-F, PGUQU-4-F and PGUQU-5-F.

The definitions of these abbreviations (acronyms) are given in table B below. In this preferred embodiment, preferably the concentration of compounds of formula IV is greater than 40%, more preferably greater than 42%, and most preferably greater than 45%.

Preferably the liquid crystal media contain 50% to 100%, more preferably 70% to 100% and most preferably 90% to 100% compounds of formulae I to VI and preferably I to IV and VI.

In the present application the term dielectrically positive means compounds or components with $\Delta\varepsilon > 3.0$, dielectrically neutral with $-1.5 \leq \Delta\varepsilon \leq 3.0$ and dielectrically negative with $\Delta\varepsilon \leq -1.5$. $\Delta\varepsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host mixture is less than 10% the concentration is reduced to 5%. The capacities of the test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

$\Delta\varepsilon$ is defined as $(\varepsilon_\| - \varepsilon_\perp)$, whereas $\varepsilon_{av.}$ is $(\varepsilon_\| + 2\varepsilon_\perp)/3$.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$, also abbreviated to $V_{(10,0,20)}$ indicating perpendicular observation and 20° C.) and the term saturation voltage refers to the optical saturation and is given for 90% relative contrast ($V_{90}$, also abbreviated to $V_{(90,0,20)}$ indicating perpendicular observation and 20° C.) both, if not explicitly stated otherwise. The capacitive threshold voltage ($V_0$), also called Freedericksz-threshold ($V_{Fr}$) is only used if explicitly mentioned.

The following abbreciations are used:

$V_{op}$=operating voltage;

$t_{on}$=time after switching on until 90% of the maximum contrast is achieved, measured from 10% of the maximum contrast;

$t_{off}$=time after switching off until 10% of the maximum contrast is achieved, measured from 90% of the maximum contrast;

$t_{sum} = t_{on} + t_{off}$.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties have been determined with test cells prepared at Merck KGaA, Germany. The test cells for the determination of $\Delta\varepsilon$ had a cell gap of approximately 20 µm. The electrode was a circular ITO electrode with an area of 1.13 cm$^2$ and a guard ring. The orientation layers were lecithin for homeotropic orientation ($\varepsilon_\|$) and polyimide AL-1054 from Japan Synthetic Rubber for homogeneous orientation ($\varepsilon_\perp$). The capacities were determined with a frequency response analyser Solatron 1260 using a sine wave with a voltage of 0.3 $V_{rms}$. The light used in the electro-optical measurements was white light. The set up used was commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point $T(C,N)$, the transition from the smectic (S) to the nematic (N) phase $T(S,N)$ and the clearing point $T(N,I)$ of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ as followsollows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO · m | $OC_nH_{2n+1}$ | $C_mH_{2m+1}$ | H | H |
| n | $C_nH_{2n+1}$ | CN | H | H |
| nN · F | $C_nH_{2n+1}$ | CN | H | F |
| nN · F · F | $C_nH_{2n+1}$ | CN | F | F |
| nF | $C_nH_{2n+1}$ | F | H | H |
| nF · F | $C_nH_{2n+1}$ | F | H | F |
| nF · F · F | $C_nH_{2n+1}$ | F | F | F |
| nOF | $OC_nH_{2n+1}$ | F | H | H |
| nCl | $C_nH_{2n+1}$ | Cl | H | H |
| nCl · F | $C_nH_{2n+1}$ | Cl | H | F |
| nCl · F · F | $C_nH_{2n+1}$ | Cl | F | F |
| n$CF_3$ | $C_nH_{2n+1}$ | $CF_3$ | H | H |
| n$CF_3$ · F | $C_nH_{2n+1}$ | $CF_3$ | H | F |
| n$CF_3$ · F · F | $C_nH_{2n+1}$ | $CF_3$ | F | F |
| n$OCF_3$ | $C_nH_{2n+1}$ | $OCF_3$ | H | H |
| n$OCF_3$ · F | $C_nH_{2n+1}$ | $OCF_3$ | H | F |
| n$OCF_3$ · F · F | $C_nH_{2n+1}$ | $OCF_3$ | F | F |

-continued

| Code for $R^1$, $R^2$, $L^1$, $L^2$ | $R^1$ | $R^2$ | $L^1$ | $L^2$ |
|---|---|---|---|---|
| n$OCF_2$ | $C_nH_{2n+1}$ | $OCHF_2$ | H | H |
| n$OCF_2$ · F | $C_nH_{2n+1}$ | $OCHF_2$ | H | F |
| n$OCF_2$ · F · F | $C_nH_{2n+1}$ | $OCHF_2$ | F | F |
| nS | $C_nH_{2n+1}$ | NCS | H | H |
| nS · F | $C_nH_{2n+1}$ | NCS | H | F |
| nS · F · F | $C_nH_{2n+1}$ | NCS | F | F |
| rVsN | $C_rH_{2r+1}-CH=CH-C_sH_{2s}-$ | CN | H | H |
| rEsN | $C_rH_{2r+1}-O-C_sH_{2s}-$ | CN | H | H |
| nAm | $C_nH_{2n+1}$ | $COOC_mH_{2m+1}$ | H | H |

TABLE A

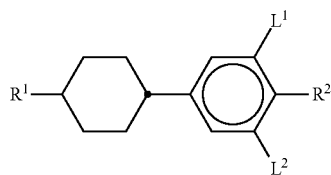

PCH

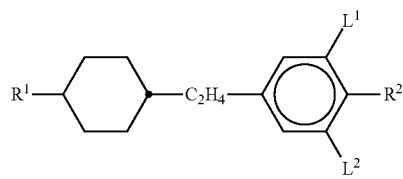

EPCH

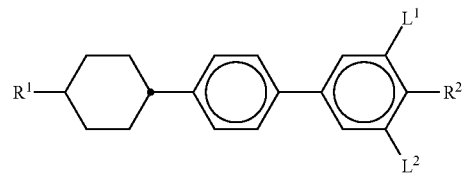

BCH

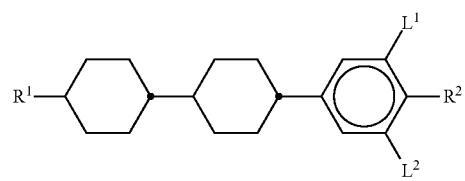

CCP

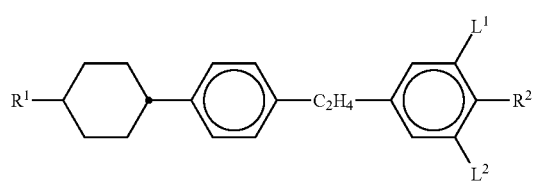

EBCH

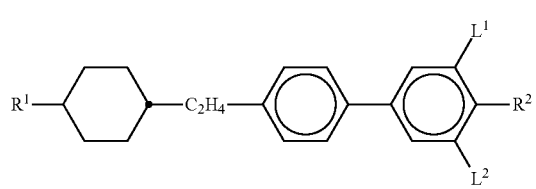

BECH

TABLE A-continued
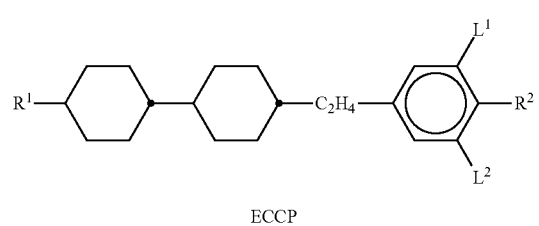
ECCP
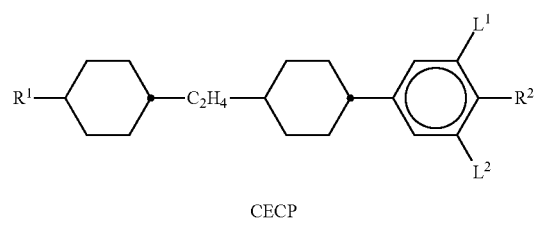
CECP
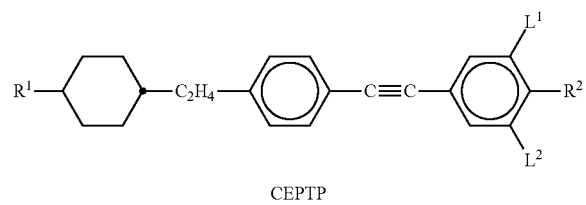
CEPTP
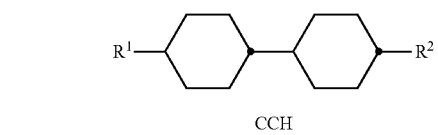
CCH
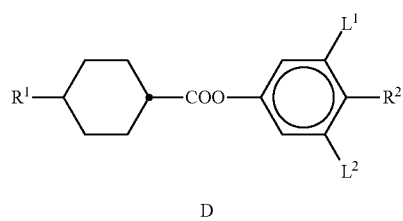
D
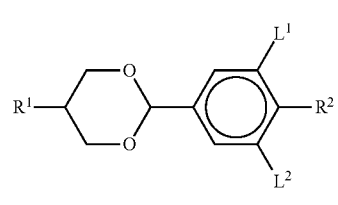
PDX
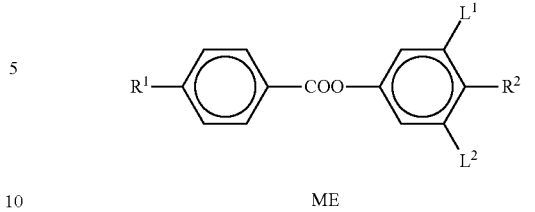
ME
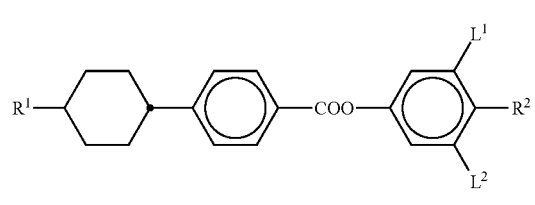
HP
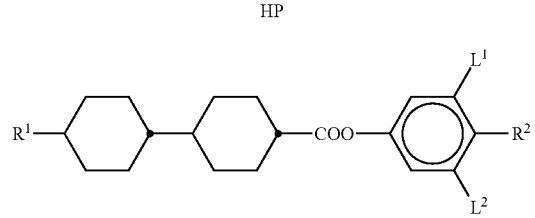
CP
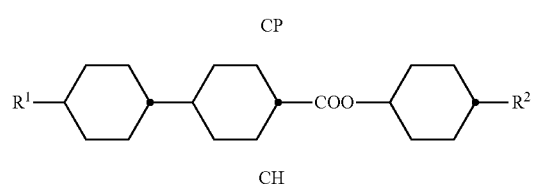
CH
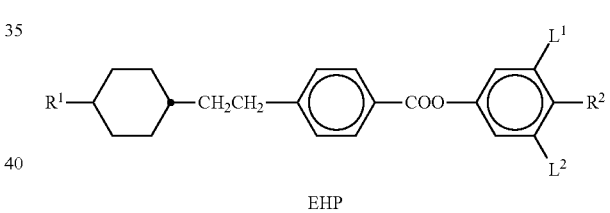
EHP
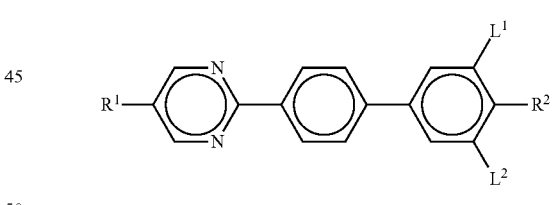
MPP
TABLE B
CB15
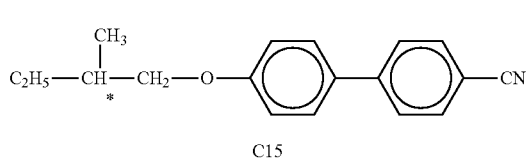
C15

TABLE B-continued
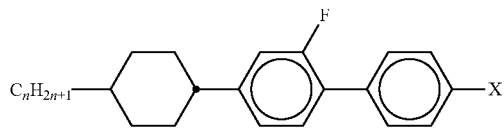
CGP-n-X
X = F, Cl, "OT" = OCF$_3$, "OD" = OCF$_2$H, "T" = CF$_3$)
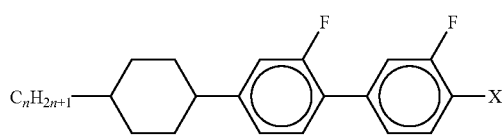
CGG-n-X
X = F, Cl, "OT" = OCF$_3$, "OD" = OCF$_2$H, "T" = CF$_3$)
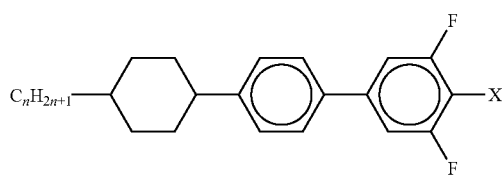
CPU-n-X
(X = F, Cl, "OT" = OCF$_3$, "OD" = OCF$_2$H, "OXF" = OCH=CF$_2$, "T" = CF$_3$)
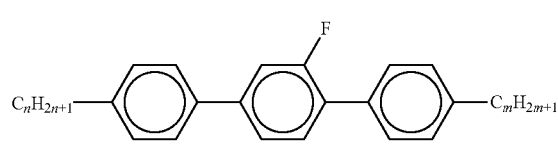
PGP-n-m
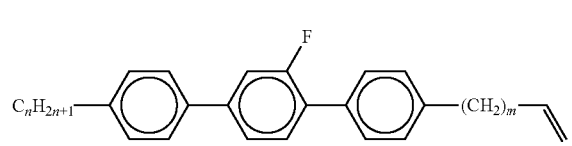
PGP-n-mV
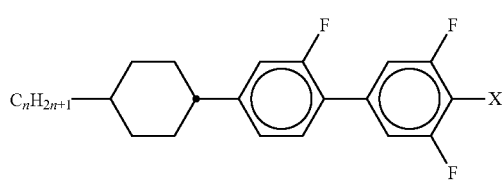
CGU-n-X
(X = F, Cl, "OT" = OCF$_3$, "OD" = OCF$_2$H, "T" = CF$_3$)

TABLE B-continued
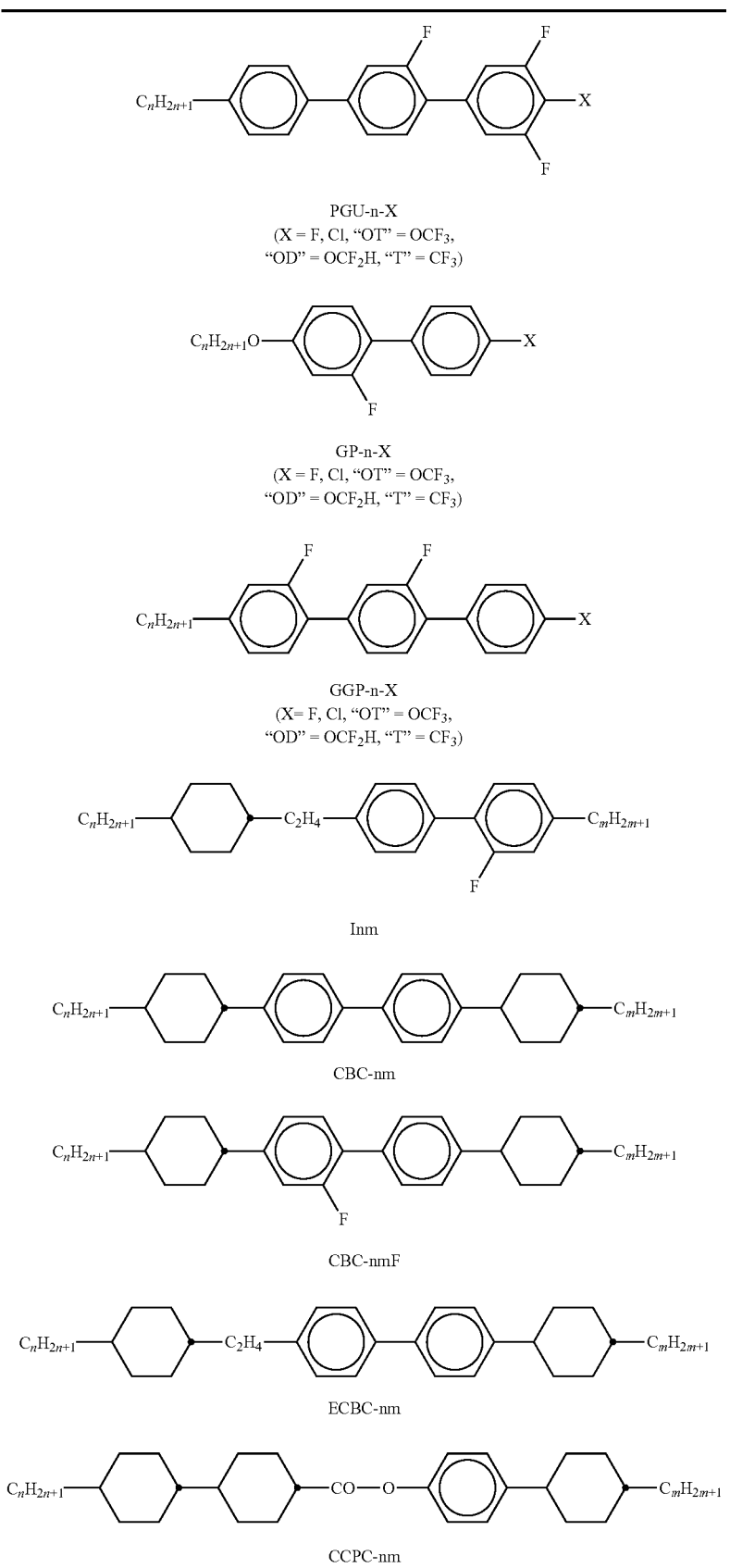

TABLE B-continued
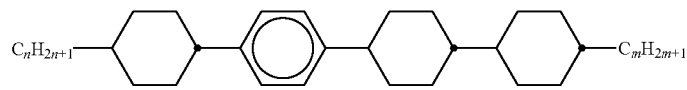
CPCC-n-m
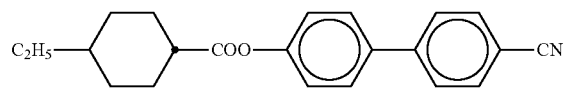
CHE
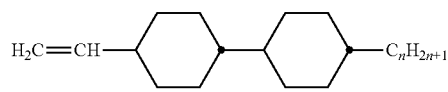
CC-n-V
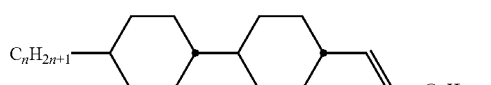
CC-n-Vm
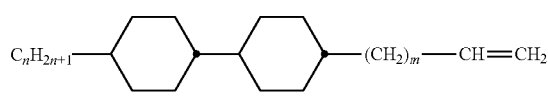
CC-n-mV
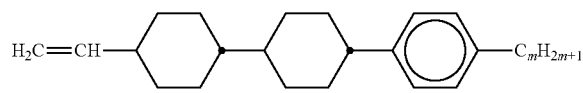
CCP-V-m
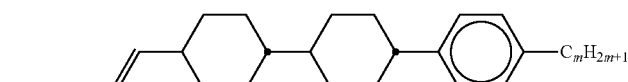
CCP-nV-m
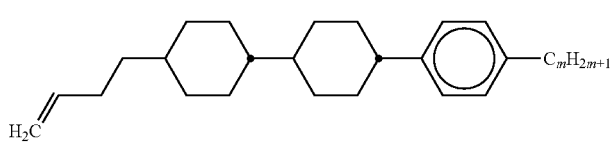
CCP-V2-m
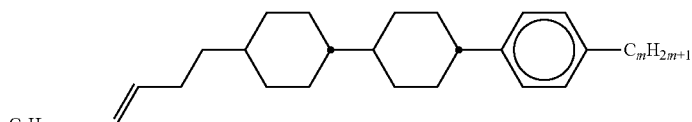
CCP-nV2-m
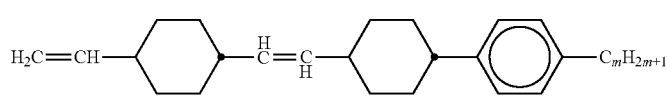
CVCP-v-m TABLE B-continued
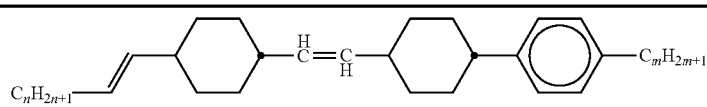
CVCP-nV-m
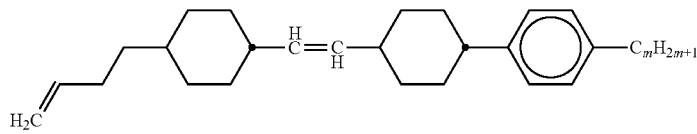
CVCP-V2-m
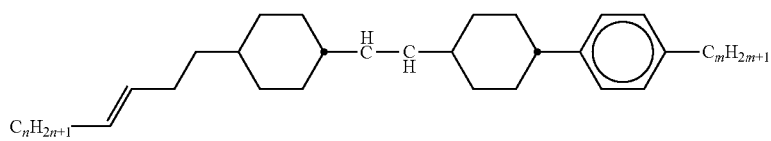
CVCP-nV2-m
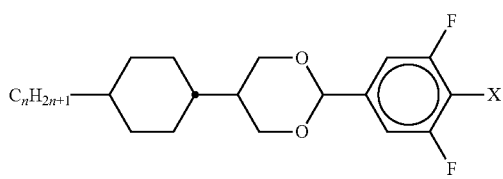
CDU-n-X
(X = F, Cl, "OT" = OCF$_3$, "OD" = OCF$_2$H, "T" = CF$_3$)
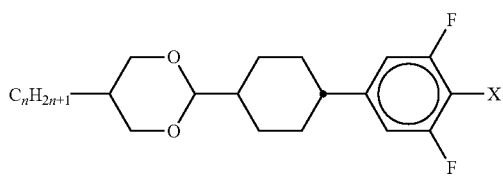
DCU-n-X
(X = F, Cl, "OT" = OCF$_3$, "OD" = OCF$_2$H, "T" = CF$_3$)
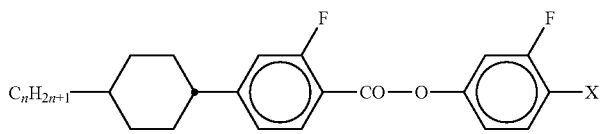
CGZG-n-X
(X = F, Cl, "OT" = OCF$_3$, "OD" = OCF$_2$H, "T" = CF$_3$)
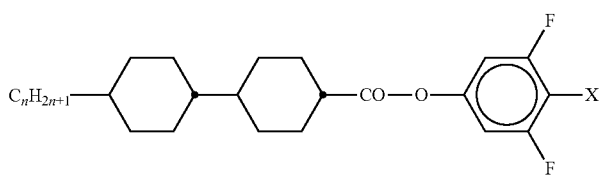
CCZU-n-X
(X = F, Cl, "OT" = OCF$_3$, "OD" = OCF$_2$H, "T" = CF$_3$)

TABLE B-continued
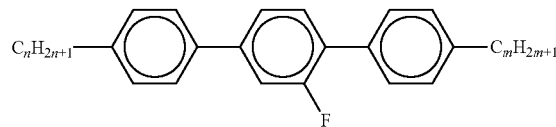
PGP-n-m
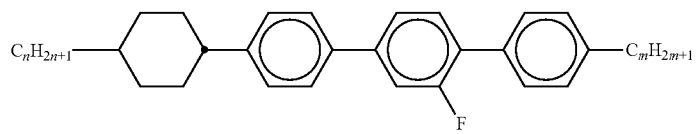
CPGP-n-m
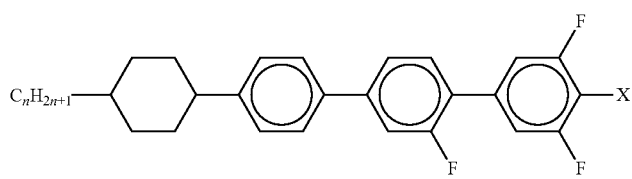
CPGU-n-X
(X = F, Cl, "OT" = OCF$_3$, "OD" =
OCF$_2$H, "T" = CF$_3$)
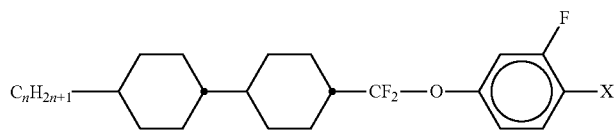
CCQG-n-X
(X = F, Cl, "OT" = OCF$_3$, "OD" =
OCF$_2$H, "T" = CF$_3$)
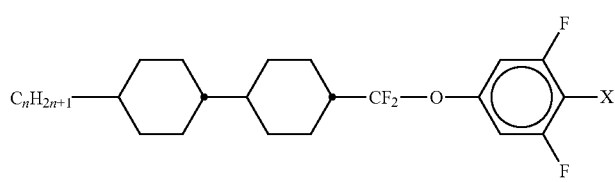
CCQU-n-X
(X = F, Cl, "OT" = OCF$_3$, "OD" =
OCF$_2$H, "T" = CF$_3$)
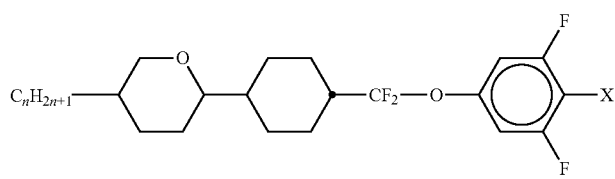
ACQU-n-X
(X = F, Cl, "OT" = OCF$_3$, "OD" =
OCF$_2$H, "T" = CF$_3$)

TABLE B-continued
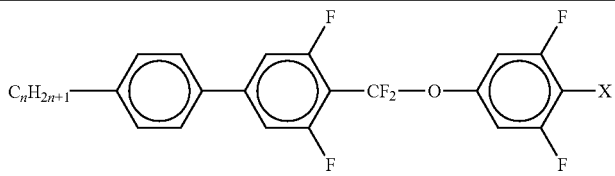
PUQU-n-X
(X = F, Cl, "OT" = OCF$_3$, "OD" = OCF$_2$H, "T" = CF$_3$)
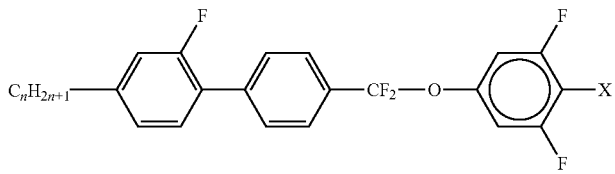
GPQU-n-X
(X = F, Cl, "OT" = OCF$_3$, "OD" = OCF$_2$H, "T" = CF$_3$)
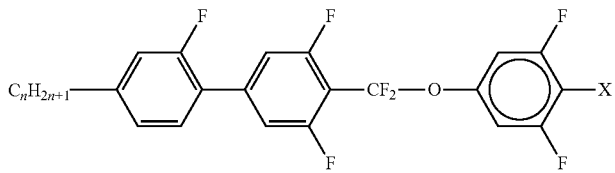
GUQU-n-X
(X = F, Cl, "OT" = OCF$_3$, "OD" = OCF$_2$H, "T" = CF$_3$)
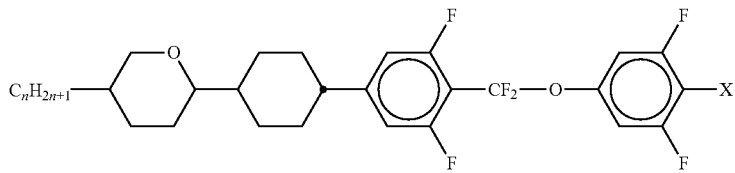
ACUQU-n-X
(X = F, Cl, "OT" = OCF$_3$, "OD" = OCF$_2$H, "T" = CF$_3$)
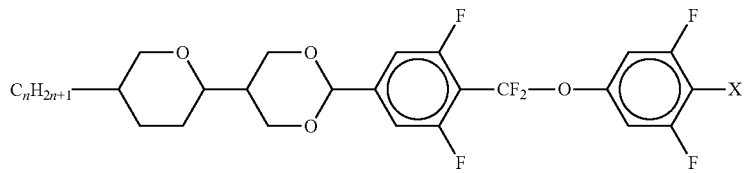
ADUQU-n-X
(X = F, Cl, "OT" = OCF$_3$, "OD" = OCF$_2$H, "T" = CF$_3$)

TABLE B-continued
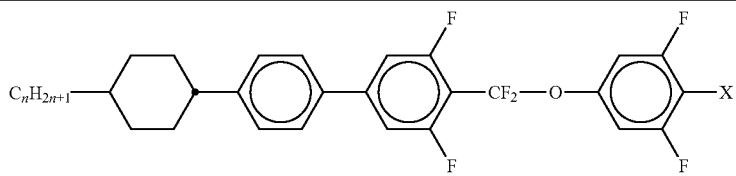
CPUQU-n-X
(X = F, Cl, "OT" = OCF$_3$, "OD" =
OCF$_2$H, "T" = CF$_3$)
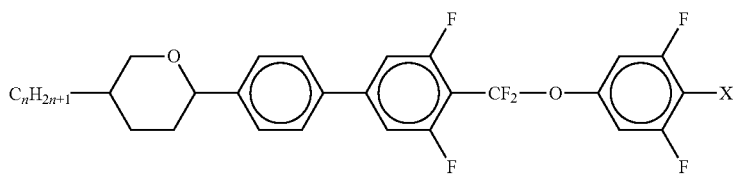
APUQU-n-X
(X = F, Cl, "OT" = OCF$_3$, "OD" =
OCF$_2$H, "T" = CF$_3$)
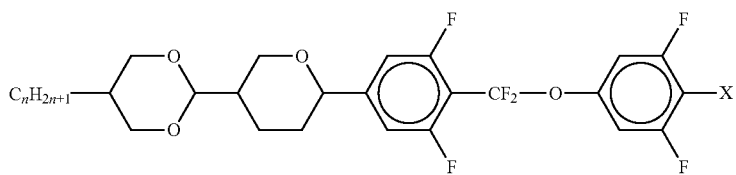
DAUQU-n-X
(X = F, Cl, "OT" = OCF$_3$, "OD" =
OCF$_2$H, "T" = CF$_3$)
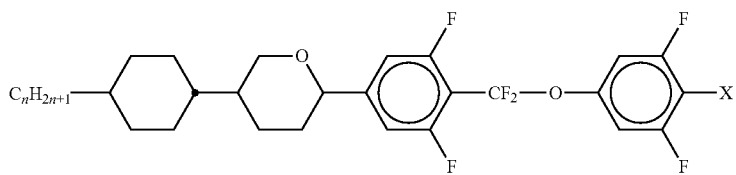
CAUQU-n-X
(X = F, Cl, "OT" = OCF$_3$, "OD" =
OCF$_2$H, "T" = CF$_3$)
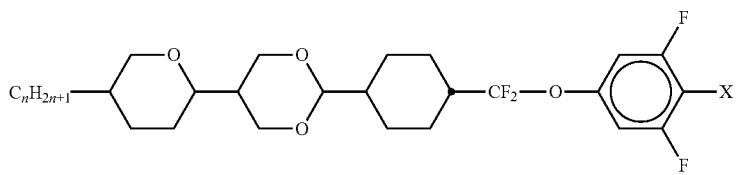
ADCQU-n-X
(X = F, Cl, "OT" = OCF$_3$, "OD" =
OCF$_2$H, "T" = CF$_3$)

TABLE B-continued
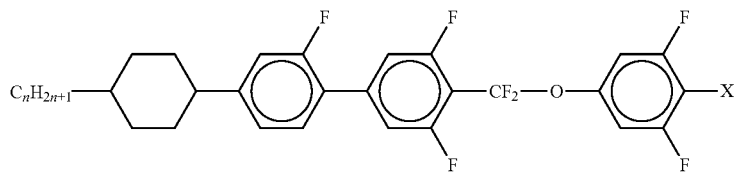
CGUQU-n-X
(X = F, Cl, "OT" = OCF$_3$, "OD" = OCF$_2$H, "T" = CF$_3$)
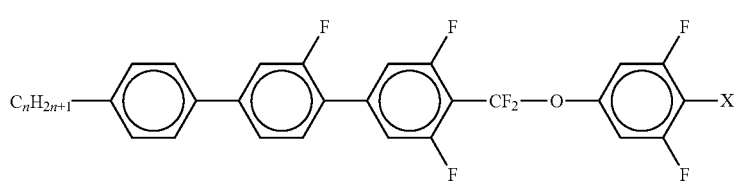
PGUQU-n-X
(X = F, Cl, "OT" = OCF$_3$, "OD" = OCF$_2$H, "T" = CF$_3$)
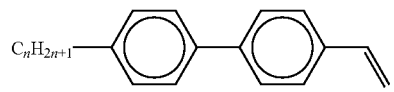
PP-n-V
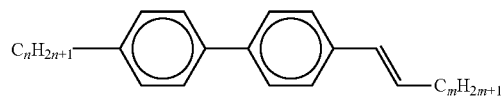
PP-n-Vm
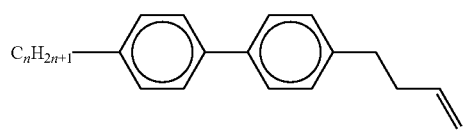
PP-n-2V
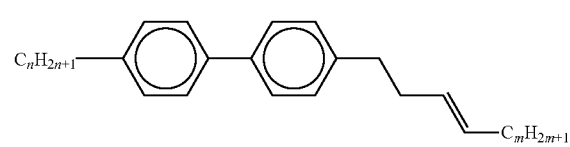
PP-n-2vm
TABLE C
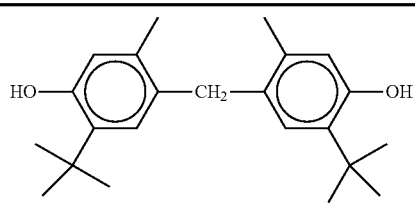

TABLE C-continued
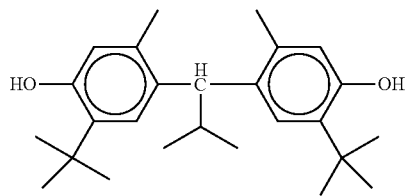
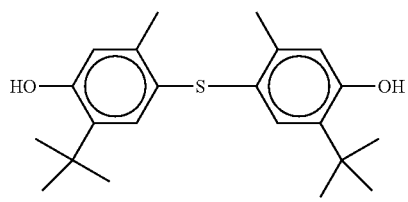
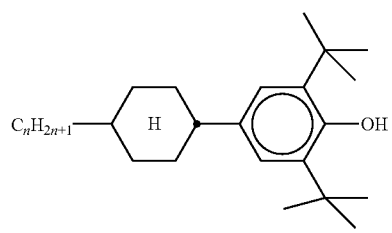
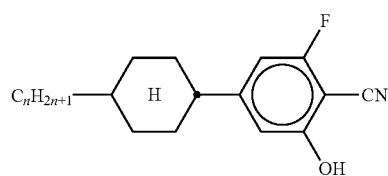
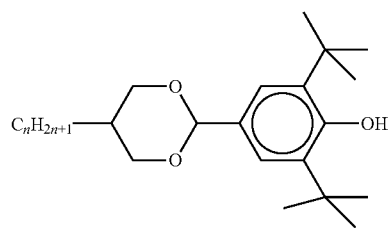
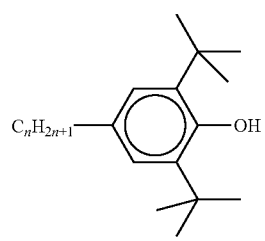
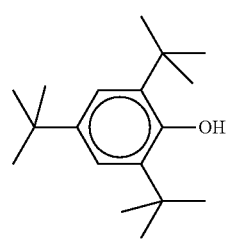

TABLE C-continued
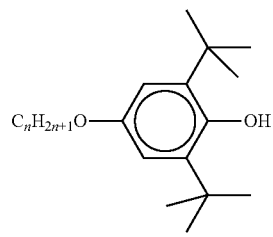
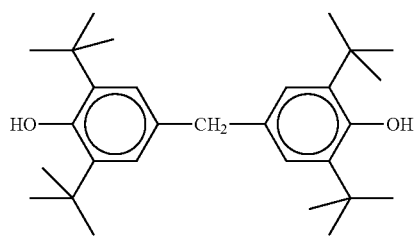
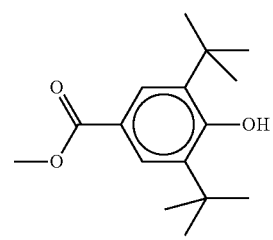
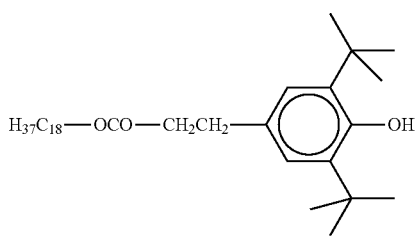
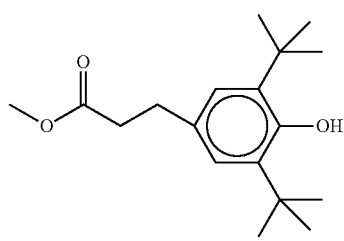
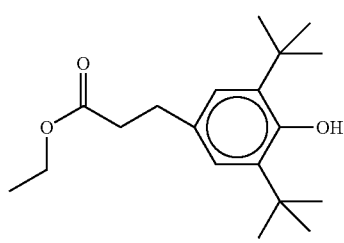

TABLE C-continued
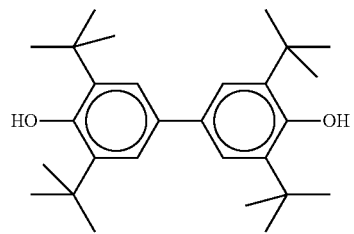
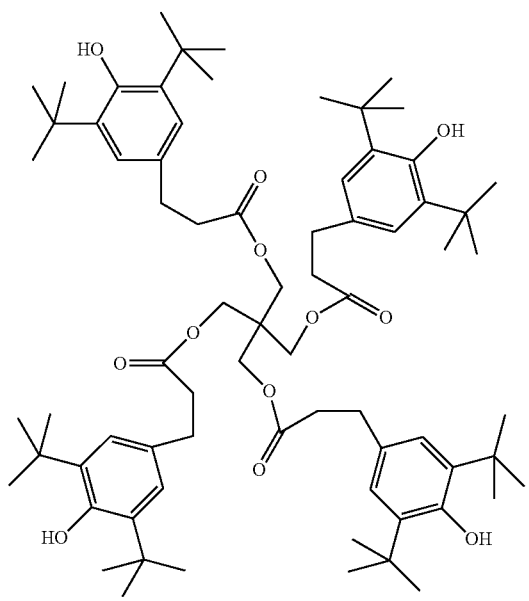 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
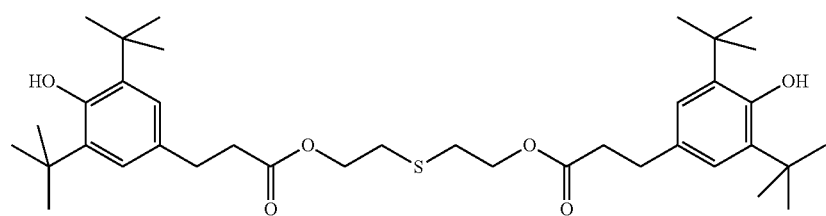 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
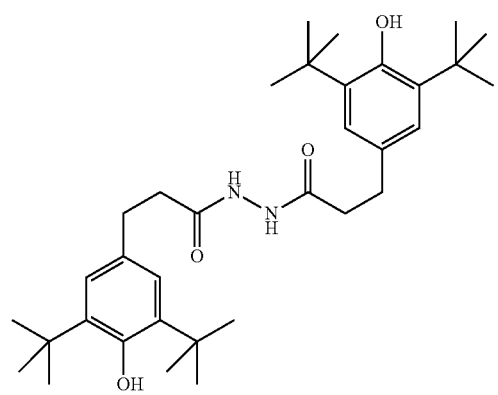 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
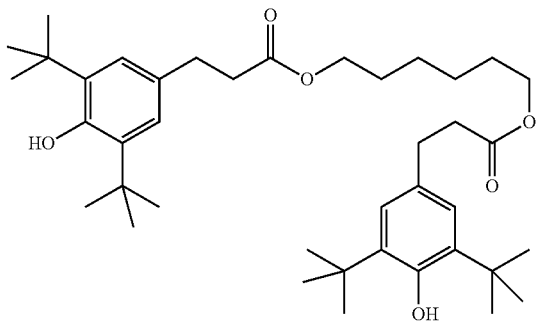 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
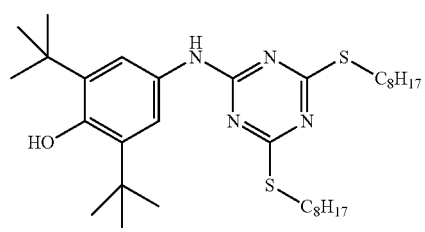
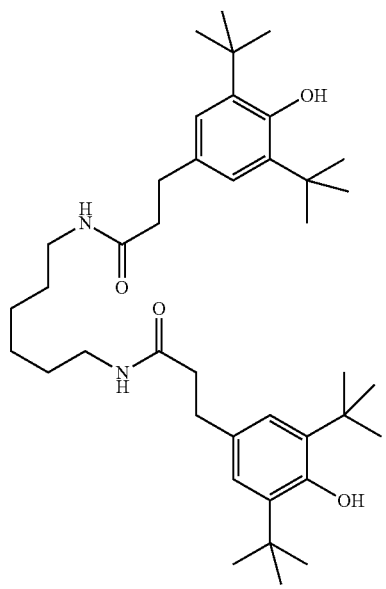 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
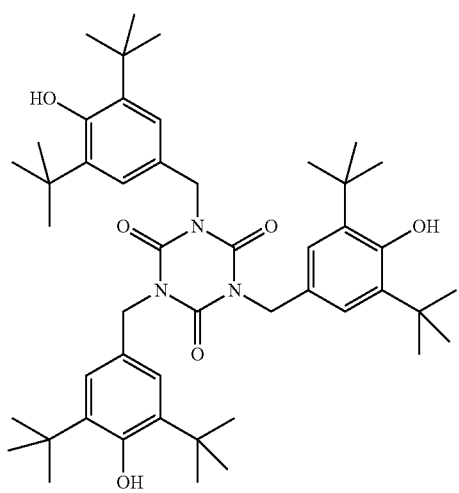 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
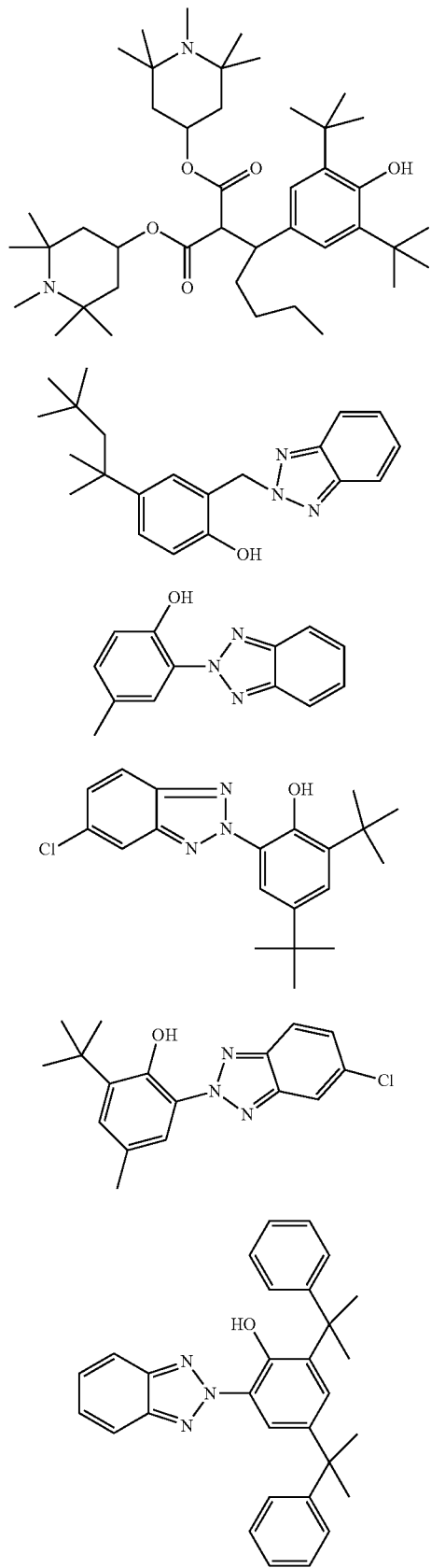

TABLE C-continued
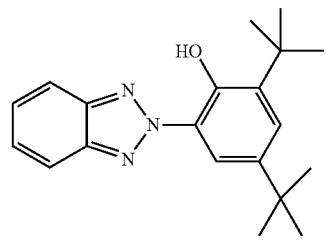 [SMILES: CC(C)(C)c1cc(-n2nc3ccccc3n2)c(O)c(C(C)(C)C)c1]
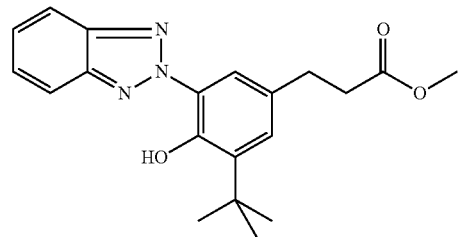 [SMILES: COC(=O)CCc1cc(-n2nc3ccccc3n2)c(O)c(C(C)(C)C)c1]
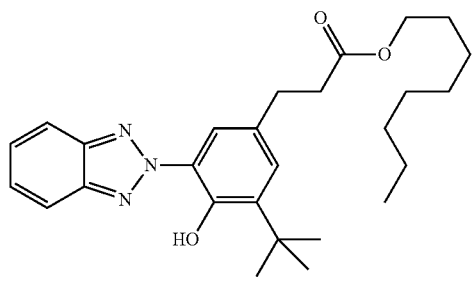 [SMILES: CCCCCCCCOC(=O)CCc1cc(-n2nc3ccccc3n2)c(O)c(C(C)(C)C)c1]
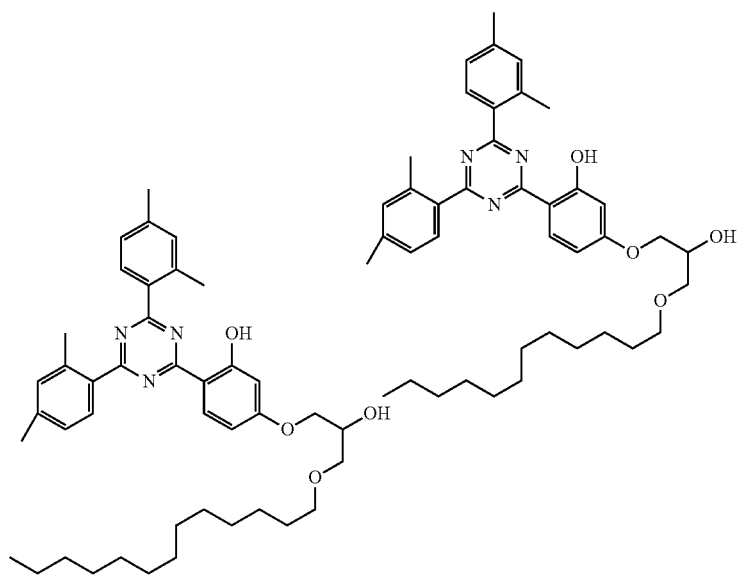
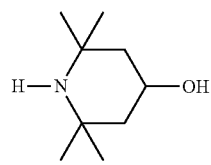

TABLE C-continued
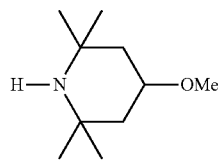
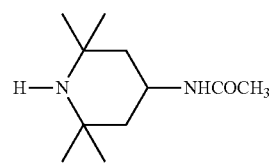
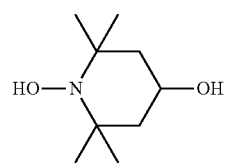
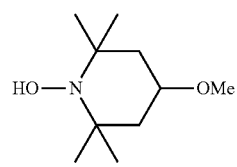
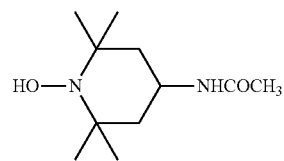
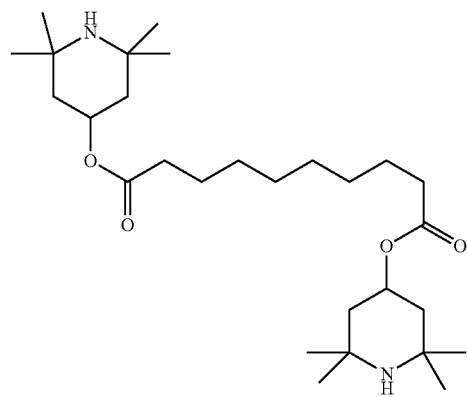

TABLE C-continued
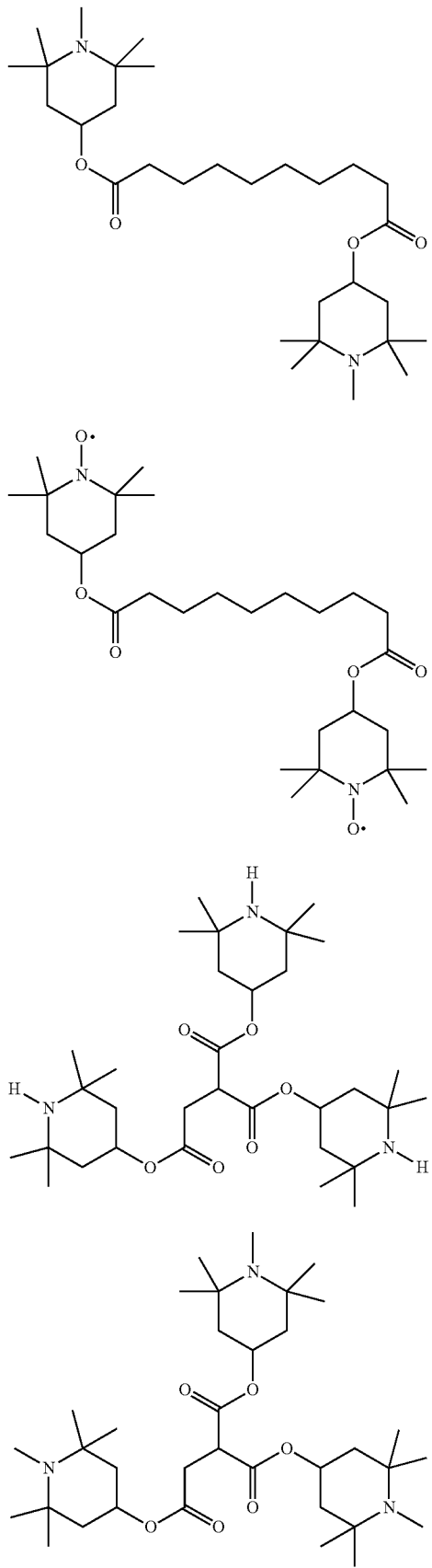

TABLE C-continued
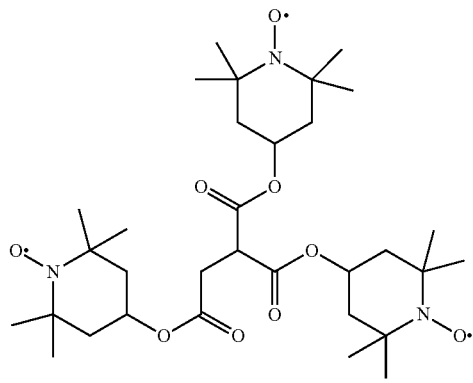
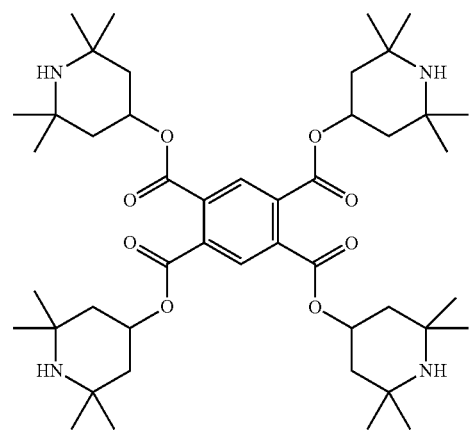
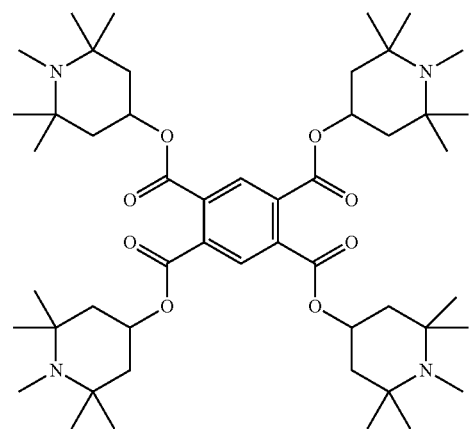

TABLE C-continued

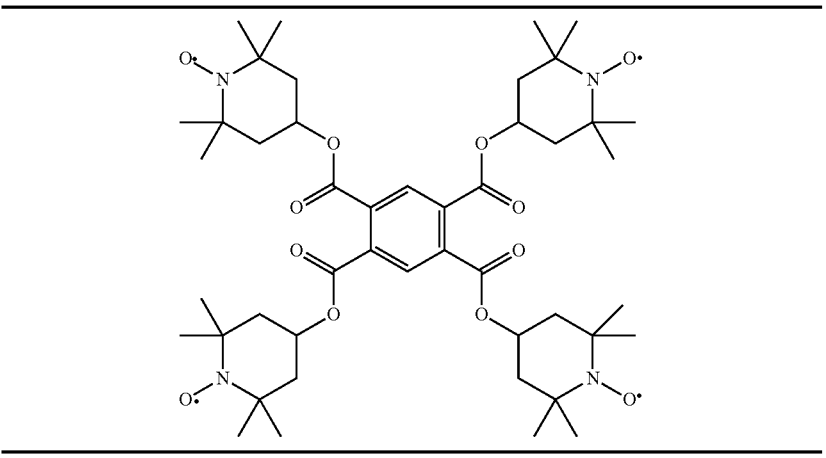

Table C shows possible stabilisers which can be added to the LC media according to the invention.
(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C The liquid crystal media according to the instant invention contain preferably

- seven or more, preferably eight or more compounds, preferably of different formulae, selected from the group of compounds of tables A and B and/or
- one or more, more preferably two or more, preferably three or more compounds, preferably of different formulae, selected from the group of compounds of table A and/or
- three or more, more preferably four or more compounds, more preferably five or more compounds, preferably of different formulae, selected from the group of compounds of table B.

EXAMPLES

The examples given in the following are illustrating the present invention without limiting it in any way.

However, the physical properties compositions illustrate to the expert, which properties can be achieved and in which ranges they can be modified. Especially the combination of the various properties, which can be preferably achieved, is thus well defined for the expert.

Example 1

A liquid crystal mixture is realized with the composition and properties given in the following table.

| | Composition Compound | |
|---|---|---|
| No. | Abbreviation | Conc./% |
| 1 | CC-3-V | 40.50 |
| 2 | CC-3-V1 | 8.00 |
| 3 | CCP-V2-1 | 3.50 |
| 4 | CPGU-3-OT | 5.00 |
| 5 | PGP-2-2V | 20.00 |
| 6 | PGUQU-3-F | 8.00 |
| 7 | PP-1-2V1 | 10.00 |
| 8 | PUQU-3-T | 5.00 |
| Σ | | 100.00 |

| Physical Properties | |
|---|---|
| $T(N, I)$ = | 75.5° C. |
| $\Delta n$ (20° C., 589.3 nm) = | 0.1318 |
| $\varepsilon_{\parallel}$ (20° C., 1 kHz) = | 7.6 |
| $\Delta\varepsilon$ (20° C., 1 kHz) = | 4.7 |
| $\gamma_1$ (20° C.) = | 54 mPa · s |
| $V_{(10, 0, 20)}$ = | 2.04 V |
| $V_{(90, 0, 20)}$ = | 3.03 V |
| $\gamma_1/[\Delta\varepsilon (V_{10})^2]$ = | 2.76 mPa · s V$^{-2}$ |
| $t_{on}$ ($V_{op}$ = 5.0 V) = | 1.50 ms |
| $t_{off}$ ($V_{op}$ = 5.0 V) = | 3.89 ms |
| $t_{sum}$ ($V_{op}$ = 5.0 V) = | 5.39 ms |

Example 2

A liquid crystal mixture is realized with the composition and properties given in the following table.

| | Composition Compound | |
|---|---|---|
| No. | Abbreviation | Conc./% |
| 1 | CC-3-V | 40.00 |
| 2 | CC-3-V1 | 8.00 |
| 3 | CCP-V2-1 | 4.00 |
| 4 | CPGU-3-OT | 5.00 |
| 5 | PGP-2-2V | 20.00 |
| 6 | PGUQU-3-F | 8.00 |
| 7 | PP-1-2V1 | 10.00 |
| 8 | GUQU-3-T | 5.00 |
| Σ | | 100.00 |

| Physical Properties | |
|---|---|
| $T(N, I)$ = | 75.0° C. |
| $\Delta n$ (20° C., 589.3 nm) = | 0.1309 |
| $\varepsilon_{\parallel}$ (20° C., 1 kHz) = | 7.7 |
| $\Delta\varepsilon$ (20° C., 1 kHz) = | 4.7 |
| $\gamma_1$ (20° C.) = | 55 mPa · s |

-continued

| | |
|---|---|
| $V_{(10, 0, 20)} =$ | 2.02 V |
| $V_{(90, 0, 20)} =$ | 3.00 V |
| $\gamma_1/[\Delta\varepsilon\ (V_{10})^2] =$ | 2.86 mPa · s V$^{-2}$ |

Example 3

A liquid crystal mixture is realized with the composition and properties given in the following table.

| Composition Compound | | |
|---|---|---|
| No. | Abbreviation | Conc./% |
| 1 | CC-3-V | 47.50 |
| 2 | PP-1-2V1 | 5.00 |
| 3 | PGP-2-2V | 19.00 |
| 4 | PGUQU-3-F | 13.00 |
| 5 | CPGU-3-OT | 4.00 |
| 6 | APUQU-3-F | 5.50 |
| 7 | PUQU-3-T | 6.00 |
| Σ | | 100.00 |

| Physical Properties | |
|---|---|
| T(N, I) = | 74.5° C. |
| Δn (20° C., 589.3 nm) = | 0.1322 |
| $\varepsilon_{\|\|}$ (20° C., 1 kHz) = | 11.3 |
| Δε (20° C., 1 kHz) = | 8.1 |
| $\gamma_1$ (20° C.) = | 60 mPa · s |
| $V_{(10, 0, 20)} =$ | 1.55 V |
| $V_{(90, 0, 20)} =$ | 2.31 V |
| $\gamma_1/[\Delta\varepsilon\ (V_{10})^2] =$ | 3.10 mPa · s V$^{-2}$ |
| $t_{on}$ ($V_{op}$ = 4.5 V) = | 1.22 ms |
| $t_{off}$ ($V_{op}$ = 4.5 V) = | 4.67 ms |
| $t_{sum}$ ($V_{op}$ = 4.5 V) = | 5.88 ms |

Example 4

A liquid crystal mixture is realized with the composition and properties given in the following table.

| Composition Compound | | |
|---|---|---|
| No. | Abbreviation | Conc./% |
| 1 | CC-3-V | 47.00 |
| 2 | PP-1-2V1 | 6.00 |
| 3 | PGP-2-2V | 19.00 |
| 4 | PGUQU-3-F | 12.00 |
| 5 | CPGU-3-OT | 5.00 |
| 6 | APUQU-3-F | 5.50 |
| 7 | GUQU-3-T | 5.50 |
| Σ | | 100.00 |

| Physical Properties | |
|---|---|
| T(N, I) = | 74.0° C. |
| Δn (20° C., 589.3 nm) = | 0.1327 |
| $\varepsilon_{\|\|}$ (20° C., 1 kHz) = | 11.2 |
| Δε (20° C., 1 kHz) = | 7.9 |
| $\gamma_1$ (20° C.) = | 60 mPa · s |
| $V_{(10, 0, 20)} =$ | 1.56 V |
| $V_{(90, 0, 20)} =$ | 2.34 V |
| $\gamma_1/[\Delta\varepsilon\ (V_{10})^2] =$ | 3.13 mPa · s V$^{-2}$ |

Example 5

A liquid crystal mixture is realized with the composition and properties given in the following table.

| Composition Compound | | |
|---|---|---|
| No. | Abbreviation | Conc./% |
| 1 | CC-3-V | 42.00 |
| 2 | PUQU-3-T | 14.50 |
| 3 | CCP-V-1 | 9.00 |
| 4 | APUQU-2-F | 6.00 |
| 5 | APUQU-3-F | 8.50 |
| 6 | PGUQU-3-F | 9.50 |
| 7 | CPGU-3-OT | 5.00 |
| 8 | PGP-2-2V | 5.50 |
| Σ | | 100.00 |

| Physical Properties | |
|---|---|
| T(N, I) = | 74.5° C. |
| Δn (20° C., 589.3 nm) = | 0.1149 |
| $\varepsilon_{\|\|}$ (20° C., 1 kHz) = | 17.6 |
| Δε (20° C., 1 kHz) = | 13.7 |
| $\gamma_1$ (20° C.) = | 77 mPa · s |
| $V_{(10, 0, 20)} =$ | 1.18 V |
| $V_{(90, 0, 20)} =$ | 1.81 V |
| $\gamma_1/[\Delta\varepsilon\ (V_{10})^2] =$ | 4.06 mPa · s V$^{-2}$ |

Example 6

A liquid crystal mixture is realized with the composition and properties given in the following table.

| Composition Compound | | | Physical Properties | |
|---|---|---|---|---|
| No. | Abbreviation | Conc./% | | |
| 1 | CC-3-V | 42.50 | T(N, I) = | 74.0° C. |
| 2 | GUQU-3-T | 13.00 | Δn (20° C., 589.3 nm) = | 0.1150 |
| 3 | CCP-V-1 | 8.00 | | |
| 4 | APUQU-2-F | 6.00 | $\varepsilon_{\|\|}$ (20° C., 1 kHz) = | 17.6 |
| 5 | APUQU-3-F | 9.00 | Δε (20° C., 1 kHz) = | 13.6 |
| 6 | PGUQU-3-F | 9.00 | $\gamma_1$ (20° C.) = | 75 mPa · s |
| 7 | CPGU-3-OT | 5.50 | $V_{(10, 0, 20)} =$ | 1.17 V |
| 8 | PGP-2-2V | 7.00 | $V_{(90, 0, 20)} =$ | 1.80 V |
| Σ | | 100.00 | $\gamma_1/[\Delta\varepsilon\ (V_{10})^2] =$ | 4.03 mPa · s V$^{-2}$ |

Example 7

A liquid crystal mixture is realized with the composition and properties given in the following table.

| Composition Compound | | | Physical Properties | |
|---|---|---|---|---|
| No. | Abbreviation | Conc./% | | |
| 1 | CC-3-V | 42.50 | T(N, I) = | 74.5° C. |
| 2 | CCP-V-1 | 12.00 | Δn (20° C., 589.3 nm) = | 0.1152 |
| 3 | PP-1-2V1 | 2.50 | | |
| 4 | PUQU-3-T | 8.00 | $\varepsilon_{\|\|}$ (20° C., 1 kHz) = | 17.2 |
| 5 | PGUQU-3-F | 8.50 | Δε (20° C., 1 kHz) = | 13.6 |
| 6 | PGUQU-4-F | 8.50 | $\gamma_1$ (20° C.) = | 75 mPa · s |
| 7 | PGUQU-5-F | 8.50 | $V_{(10, 0, 20)} =$ | 1.19 V |

-continued

| No. | Abbreviation | Conc./% | Physical Properties | |
|---|---|---|---|---|
| 8 | APUQU-3-F | 9.50 | $V_{(90, 0, 20)} =$ | 1.84 V |
| Σ | | 100.00 | $\gamma_1/[\Delta\varepsilon\,(V_{10})^2] =$ | 4.10 mPa · s V$^{-2}$ |
| | | | $t_{on}\,(V_{op} = 3.3\,V) =$ | 2.21 ms |
| | | | $t_{off}\,(V_{op} = 3.3\,V) =$ | 7.89 ms |
| | | | $t_{sum}\,(V_{op} = 3.3\,V) =$ | 10.10 ms |

Example 8

A liquid crystal mixture is realized with the composition and properties given in the following table.

| No. | Abbreviation | Conc./% | Physical Properties | |
|---|---|---|---|---|
| 1 | CC-3-V | 45.50 | T(N, I) = | 75.0° C. |
| 2 | CCP-V-1 | 9.50 | Δn (20° C., 589.3 nm) = | 0.1149 |
| 3 | GUQU-3-T | 7.50 | | |
| 4 | PGUQU-3-F | 7.50 | $\varepsilon_\parallel$ (20° C., 1 kHz) = | 16.5 |
| 5 | PGUQU-4-F | 8.00 | Δε (20° C., 1 kHz) = | 12.7 |
| 6 | PGUQU-5-F | 8.50 | $\gamma_1$ (20° C.) = | 73 mPa · s |
| 7 | APUQU-3-F | 9.00 | $V_{(10, 0, 20)} =$ | 1.22 V |
| 8 | PGP-2-2V | 4.50 | $V_{(90, 0, 20)} =$ | 1.89 V |
| Σ | | 100.00 | $\gamma_1/[\Delta\varepsilon\,(V_{10})^2] =$ | 3.85 mPa · s V$^{-2}$ |

Example 9

A liquid crystal mixture is realized with the composition and properties given in the following table.

| No. | Abbreviation | Conc./% | Physical Properties | |
|---|---|---|---|---|
| 1 | CC-3-V | 44.50 | T(N, I) = | 74.5° C. |
| 2 | APUQU-2-F | 6.50 | Δn (20° C., 589.3 nm) = | 0.1143 |
| 3 | APUQU-3-F | 8.00 | | |
| 4 | CPGU-3-OT | 4.50 | $\varepsilon_\parallel$ (20° C., 1 kHz) = | 16.2 |
| 5 | PGUQU-3-F | 8.50 | Δε (20° C., 1 kHz) = | 12.4 |
| 6 | PUQU-3-T | 6.00 | $\gamma_1$ (20° C.) = | 69 mPa · s |
| 7 | PGP-2-2V | 2.00 | $V_{(10, 0, 20)} =$ | 1.19 V |
| 8 | CPU-3-OXF | 20.00 | $V_{(90, 0, 20)} =$ | 1.82 V |
| Σ | | 100.00 | $\gamma_1/[\Delta\varepsilon\,(V_{10})^2] =$ | 3.97 mPa · s V$^{-2}$ |

Example 10

A liquid crystal mixture is realized with the composition and properties given in the following table.

| No. | Abbreviation | Conc./% | Physical Properties | |
|---|---|---|---|---|
| 1 | CC-3-V | 44.50 | T(N, I) = | 74.5° C. |
| 2 | APUQU-2-F | 6.50 | Δn (20° C., 589.3 nm) = | 0.1141 |
| 3 | APUQU-3-F | 8.00 | | |
| 4 | CPGU-3-OT | 4.50 | $\varepsilon_\parallel$ (20° C., 1 kHz) = | 16.4 |
| 5 | PGUQU-3-F | 8.50 | Δε (20° C., 1 kHz) = | 12.5 |
| 6 | GUQU-3-T | 5.50 | $\gamma_1$ (20° C.) = | 69 mPa · s |
| 7 | PGP-2-2V | 2.00 | $V_{(10, 0, 20)} =$ | 1.19 V |
| 8 | CPU-3-OXF | 20.50 | $V_{(90, 0, 20)} =$ | 1.81 V |
| Σ | | 100.00 | $\gamma_1/[\Delta\varepsilon\,(V_{10})^2] =$ | 3.91 mPa · s V$^{-2}$ |

Example 11

A liquid crystal mixture is realized with the composition and properties given in the following table.

| No. | Abbreviation | Conc./% | Physical Properties | |
|---|---|---|---|---|
| 1 | CC-3-V | 43.50 | T(N, I) = | 75.0° C. |
| 2 | CCP-V-1 | 4.00 | Δn (20° C., 589.3 nm) = | 0.1151 |
| 3 | PUQU-3-T | 4.50 | | |
| 4 | PGUQU-3-F | 6.00 | $\varepsilon_\parallel$ (20° C., 1 kHz) = | 16.0 |
| 5 | PGUQU-4-F | 6.50 | Δε (20° C., 1 kHz) = | 12.2 |
| 6 | PGUQU-5-F | 7.00 | $\gamma_1$ (20° C.) = | 70 mPa · s |
| 7 | APUQU-3-F | 8.00 | $V_{(10, 0, 20)} =$ | 1.20 V |
| 8 | CPU-3-OXF | 20.50 | $V_{(90, 0, 20)} =$ | 1.85 V |
| Σ | | 100.00 | $\gamma_1/[\Delta\varepsilon\,(V_{10})^2] =$ | 3.98 mPa · s V$^{-2}$ |

Example 12

A liquid crystal mixture is realized with the composition and properties given in the following table.

| No. | Abbreviation | Conc./% | Physical Properties | |
|---|---|---|---|---|
| 1 | CC-3-V | 43.00 | T(N, I) = | 75.0° C. |
| 2 | CCP-V-1 | 4.50 | Δn (20° C., 589.3 nm) = | 0.1150 |
| 3 | GUQU-3-T | 4.50 | | |
| 4 | PGUQU-3-F | 6.00 | $\varepsilon_\parallel$ (20° C., 1 kHz) = | 16.2 |
| 5 | PGUQU-4-F | 6.50 | Δε (20° C., 1 kHz) = | 12.3 |
| 6 | PGUQU-5-F | 7.00 | $\gamma_1$ (20° C.) = | 70 mPa · s |
| 7 | APUQU-3-F | 8.00 | $V_{(10, 0, 20)} =$ | 1.20 V |
| 8 | CPU-3-OXF | 20.50 | $V_{(90, 0, 20)} =$ | 1.84 V |
| Σ | | 100.00 | $\gamma_1/[\Delta\varepsilon\,(V_{10})^2] =$ | 3.97 mPa · s V$^{-2}$ |

Example 13

A liquid crystal mixture is realized with the composition and properties given in the following table.

| No. | Composition Compound Abbreviation | Conc./% | Physical Properties | |
|---|---|---|---|---|
| 1 | CC-3-V | 40.00 | T(N, I) = | 74.5 °C. |
| 2 | PGP-2-2V | 11.50 | Δn (20° C., 589.3 nm) = | 0.1255 |
| 3 | PUQU-3-T | 12.00 | | |
| 4 | CCP-V-1 | 3.50 | ε∥ (20° C., 1 kHz) = | 17.4 |
| 5 | APUQU-2-F | 6.00 | Δε (20° C., 1 kHz) = | 13.5 |
| 6 | APUQU-3-F | 8.00 | γ$_1$ (20° C.) = | 78 mPa · s |
| 7 | PGUQU-3-F | 9.50 | V$_{(10, 0, 20)}$ = | 1.17 V |
| 8 | CPGU-3-OT | 4.00 | V$_{(90, 0, 20)}$ = | 1.79 V |
| 9 | CPU-3-F | 5.50 | γ$_1$/[Δε (V$_{10}$)$^2$] = | 4.18 mPa · s V$^{-2}$ |
| Σ | | 100.00 | | |

Example 14

A liquid crystal mixture is realized with the composition and properties given in the following table.

| No. | Composition Compound Abbreviation | Conc./% | Physical Properties | |
|---|---|---|---|---|
| 1 | CC-3-V | 41.00 | T(N, I) = | 74.5° C. |
| 2 | PGP-2-2V | 13.50 | Δn (20° C., 589.3 nm) = | 0.1253 |
| 3 | GUQU-3-T | 11.00 | | |
| 4 | CCP-V-1 | 3.50 | ε∥ (20° C., 1 kHz) = | 17.4 |
| 5 | APUQU-2-F | 6.50 | Δε (20° C., 1 kHz) = | 13.1 |
| 6 | APUQU-3-F | 8.00 | γ$_1$ (20° C.) = | 75 mPa · s |
| 7 | PGUQU-3-F | 9.00 | V$_{(10, 0, 20)}$ = | 1.19 V |
| 8 | CPGU-3-OT | 4.00 | V$_{(90, 0, 20)}$ = | 1.82 V |
| 9 | CPU-3-F | 3.50 | γ$_1$/[Δε (V$_{10}$)$^2$] = | 4.08 mPa · s V$^{-2}$ |
| Σ | | 100.00 | | |

Example 15

A liquid crystal mixture is realized with the composition and properties given in the following table.

| No. | Composition Compound Abbreviation | Conc./% | Physical Properties | |
|---|---|---|---|---|
| 1 | CC-3-V | 43.50 | T(N, I) = | 74.5° C. |
| 2 | CCP-V-1 | 5.00 | Δn (20° C., 589.3 nm) = | 0.1255 |
| 3 | PGP-2-2V | 9.50 | | |
| 4 | PUQU-3-T | 9.50 | ε∥ (20° C., 1 kHz) = | 17.4 |
| 5 | PGUQU-3-F | 7.00 | Δε (20° C., 1 kHz) = | 13.7 |
| 6 | PGUQU-4-F | 8.50 | γ$_1$ (20° C.) = | 77 mPa · s |
| 7 | PGUQU-5-F | 9.00 | V$_{(10, 0, 20)}$ = | 1.18 V |
| 8 | APUQU-3-F | 8.00 | V$_{(90, 0, 20)}$ = | 1.81 V |
| Σ | | 100.00 | γ$_1$/[Δε (V$_{10}$)$^2$] = | 4.05 mPa · s V$^{-2}$ |
| | | | t$_{on}$ (V$_{op}$ = 3.3 V) = | 1.83 ms |
| | | | t$_{off}$ (V$_{op}$ = 3.3 V) = | 6.64 ms |
| | | | t$_{sum}$ (V$_{op}$ = 3.3 V) = | 8.47 ms |

Example 16

A liquid crystal mixture is realized with the composition and properties given in the following table.

| No. | Composition Compound Abbreviation | Conc./% | Physical Properties | |
|---|---|---|---|---|
| 1 | CC-3-V | 44.00 | T(N, I) = | 74.5° C. |
| 2 | CCP-V-1 | 6.00 | Δn (20° C., 589.3 nm) = | 0.1251 |
| 3 | PGP-2-2V | 11.00 | | |
| 4 | GUQU-3-T | 8.50 | ε∥ (20° C., 1 kHz) = | 16.3 |
| 5 | PGUQU-3-F | 7.00 | Δε (20° C., 1 kHz) = | 12.6 |
| 6 | PGUQU-4-F | 8.00 | γ$_1$ (20° C.) = | 73 mPa · s |
| 7 | PGUQU-5-F | 9.00 | V$_{(10, 0, 20)}$ = | 1.23 V |
| 8 | APUQU-3-F | 6.50 | V$_{(90, 0, 20)}$ = | 1.88 V |
| Σ | | 100.00 | γ$_1$/[Δε (V$_{10}$)$^2$] = | 3.87 mPa · s V$^{-2}$ |

Example 17

A liquid crystal mixture is realized with the composition and properties given in the following table.

| No. | Composition Compound Abbreviation | Conc./% | Physical Properties | |
|---|---|---|---|---|
| 1 | CC-3-V | 39.50 | T(N, I) = | 75.5° C. |
| 2 | APUQU-2-F | 5.00 | Δn (20° C., 589.3 nm) = | 0.1260 |
| 3 | APUQU-3-F | 6.00 | | |
| 4 | CPGU-3-OT | 3.50 | ε∥ (20° C., 1 kHz) = | 17.0 |
| 5 | PGUQU-3-F | 9.50 | Δε (20° C., 1 kHz) = | 13.0 |
| 6 | PUQU-3-T | 9.00 | γ$_1$ (20° C.) = | 72 mPa · s |
| 7 | PGP-2-2V | 7.50 | V$_{(10, 0, 20)}$ = | 1.19 V |
| 8 | CPU-3-OXF | 20.00 | V$_{(90, 0, 20)}$ = | 1.79 V |
| Σ | | 100.00 | γ$_1$/[Δε (V$_{10}$)$^2$] = | 3.95 mPa · s V$^{-2}$ |

Example 18

A liquid crystal mixture is realized with the composition and properties given in the following table.

| No. | Composition Compound Abbreviation | Conc./% | Physical Properties | |
|---|---|---|---|---|
| 1 | CC-3-V | 39.50 | T(N, I) = | 76.0° C. |
| 2 | APUQU-2-F | 5.00 | Δn (20° C., 589.3 nm) = | 0.1260 |
| 3 | APUQU-3-F | 6.00 | | |
| 4 | CPGU-3-OT | 4.50 | ε∥ (20° C., 1 kHz) = | 16.8 |
| 5 | PGUQU-3-F | 8.50 | Δε (20° C., 1 kHz) = | 12.7 |
| 6 | GUQU-3-T | 9.00 | γ$_1$ (20° C.) = | 70 mPa · s |
| 7 | PGP-2-2V | 8.50 | V$_{(10, 0, 20)}$ = | 1.19 V |
| 8 | CPU-3-OXF | 19.00 | V$_{(90, 0, 20)}$ = | 1.78 V |
| Σ | | 100.00 | γ$_1$/[Δε (V$_{10}$)$^2$] = | 3.91 mPa · s V$^{-2}$ |

Example 19

A liquid crystal mixture is realized with the composition and properties given in the following table.

Example 20

A liquid crystal mixture is realized with the composition and properties given in the following table.

| No. | Composition Compound Abbreviation | Conc./% | Physical Properties | |
|---|---|---|---|---|
| 1 | CC-3-V | 41.00 | T(N, I) = | 75.0° C. |
| 2 | APUQU-3-F | 4.00 | Δn (20° C., 589.3 | 0.1251 |
| 3 | PGUQU-3-F | 7.00 | nm) = | |
| 4 | PGUQU-4-F | 7.00 | ε‖ (20° C., 1 kHz) = | 16.7 |
| 5 | PGUQU-5-F | 8.00 | Δε (20° C., 1 kHz) = | 12.9 |
| 6 | GUQU-3-T | 4.50 | γ$_1$ (20° C.) = | 72 mPa · s |
| 7 | PGP-2-2V | 4.00 | V$_{(10, 0, 20)}$ = | 1.19 V |
| 8 | CPU-3-OXF | 24.50 | V$_{(90, 0, 20)}$ = | 1.80 V |
| Σ | | 100.00 | γ$_1$/[Δε (V$_{10}$)$^2$] = | 3.99 mPa · s V$^{-2}$ |

The invention claimed is:

1. A liquid crystal medium, comprising
   one or more compounds of formula I

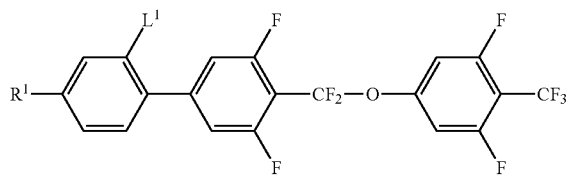
I wherein
   $R^1$ denotes alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, and
   $L^1$ denotes H or F;
and
   one or more compounds of formula II-1a;
and
   one or more compounds of formula II-1g;
and
   optionally one or more compounds of formula III;

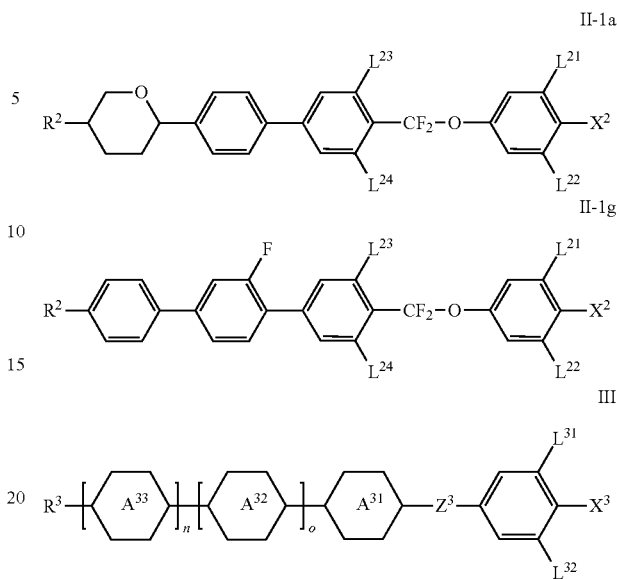

wherein
   $R^2$ and $R^3$ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

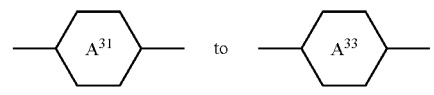

are, independently of each other,

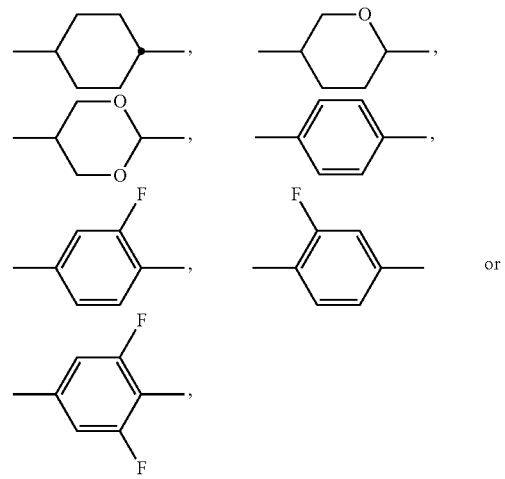

$L^{21}$, $L^{22}$, $L^{23}$, $L^{24}$,
$L^{31}$ and $L^{32}$ are, independently of each other, H or F,
$X^2$ and $X^3$ are, independently of each other, halogen, halogenated alkyl or alkoxy with 1 to 3 C-atoms, or halogenated alkenyl or alkenyloxy with 2 or 3 C-atoms,
$Z^3$ is —CH$_2$CH$_2$—, —CF$_2$CF$_2$—, —COO—, trans—CH=CH—, trans—CF=CF—, —CH$_2$O— or a single bond, and
n and o are, independently of each other, 0 or 1;

and wherein the liquid crystal medium has a Δε, at 1 kHz and 20° C., of 8 to 14.

2. The liquid crystal medium according to claim 1, wherein $L^1$ in formula I denotes H.

3. The liquid crystal medium according to claim 1, which comprises a compound of formula III.

4. The liquid crystal medium according to claim 1, wherein a compound of formula II-1g is a compound of formula II-1g-1

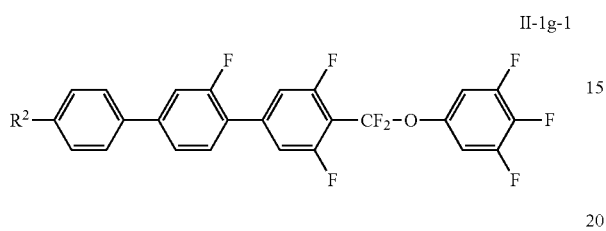

II-1g-1 wherein
$R^2$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms.

5. The liquid crystal medium according to claim 1, which additionally comprises one or more compounds of formula IV

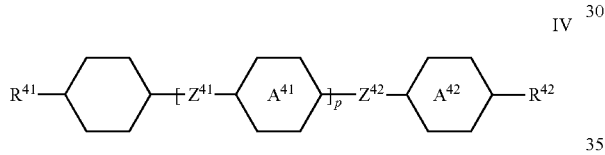

IV wherein
$R^{41}$ and $R^{42}$ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

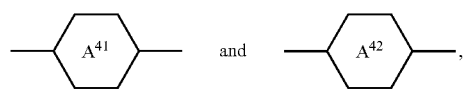

independently of each other, and in case

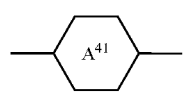

is present twice, also these, independently of each other, are

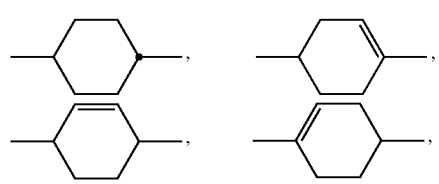

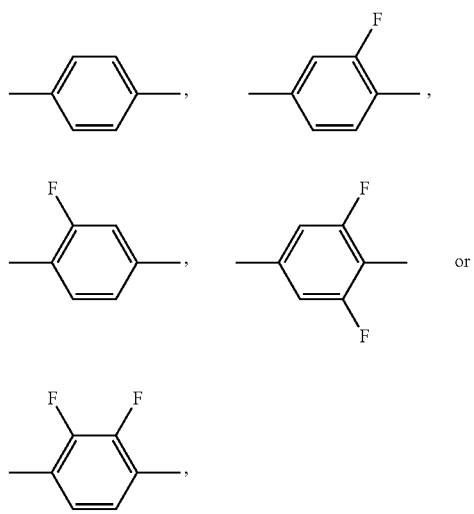

$Z^{41}$ and $Z^{42}$ are, independently of each other, and in case $Z^{41}$ is present twice, also these independently of each other, —CH$_2$CH$_2$—, —COO—, trans-—CH=CH—, trans-—CF=CF—, —CH$_2$O—, —CF$_2$O—, —C≡C— or a single bond, and p is 0, 1 or 2.

6. The liquid crystal medium according to claim 5, wherein the one or more compounds of formula IV are selected from the group consisting of compounds of formulae IV-1 to IV-5

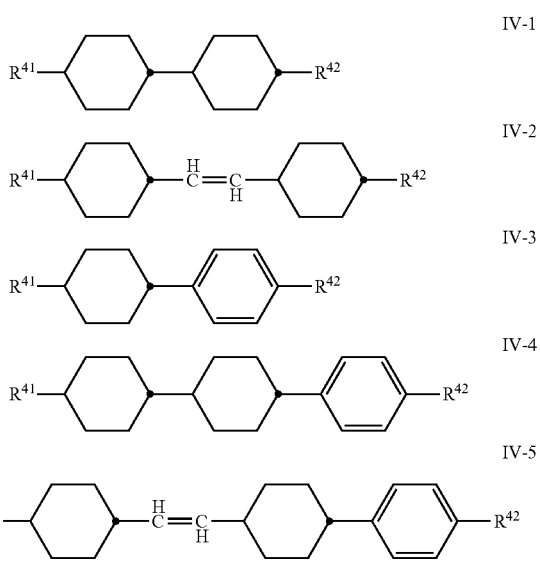

wherein
$R^{41}$ and $R^{42}$ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms.

7. The liquid crystal medium according to claim 1, which additionally comprises one or more compounds of formula VI

VI

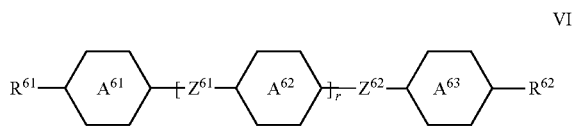

wherein
R$^{61}$ and R$^{62}$ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

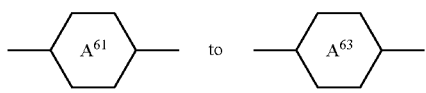

in each occurrence independently of each other, denote

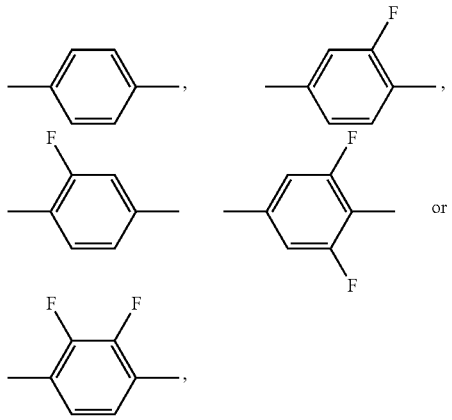

Z$^{61}$ and Z$^{62}$ are, independently of each other, —CH$_2$CH$_2$—, —COO—, trans-—CH=CH—, trans-—CF=CF—, —CH$_2$O—, —CF$_2$O, —C≡C— or a single bond, and
r is 0, 1 or 2.

8. The liquid crystal medium according to claim 7, wherein the one or more compounds of formula VI are selected from the group consisting of compounds of formulae VI-1 to VI-4

VI-1

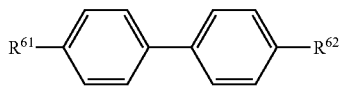

VI-2

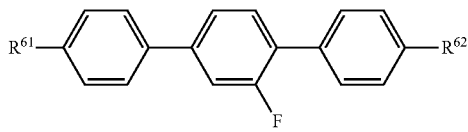

VI-3

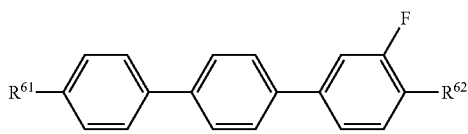

-continued

VI-4

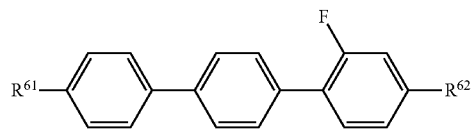

wherein
R$^{61}$ and R$^{62}$ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms.

9. The liquid crystal medium according to claim 1, wherein the total concentration of the one or more compounds of formula I in the medium is in the range of 1% to 20%.

10. A liquid crystal display, comprising a liquid crystal medium according to claim 1.

11. The liquid crystal display according to claim 10, which is addressed by an active matrix.

12. The liquid crystal medium according to claim 1, which has a Δε, at 1 kHz and 20° C., of 8 to 13.

13. The liquid crystal medium according to claim 1, wherein Z$^3$ is —CH$_2$CH$_2$—, —CF$_2$CF$_2$—, —COO—, trans-—CH=CH—, trans-—CF=CF— or —CH$_2$O—.

14. A process for preparing the liquid-crystalline medium according to claim 1, comprising mixing one or more compounds of formula I with one or more compounds of formula II-1a and with one or more compounds of formula II-1 g, and optionally with one or more compounds of formula III, and optionally with one or more additives and/or stabilisers.

15. A liquid crystal medium, comprising
one or more compounds of formula I

I

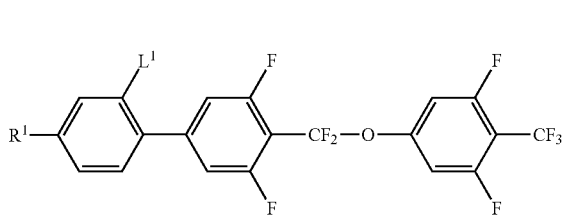

wherein
R$^1$ denotes alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, and
L$^1$ denotes H or F;
and
one or more compounds of formula II-1a II-1a

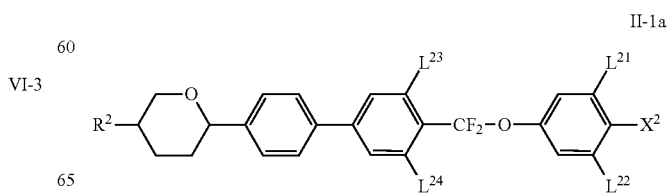

wherein
R² is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,
$L^{21}$, $L^{22}$, $L^{23}$ and $L^{24}$ are, independently of each other, H or F, and
X² is halogen, halogenated alkyl or alkoxy with 1 to 3 C-atoms, or halogenated alkenyl or alkenyloxy with 2 or 3 C-atoms,
and wherein the liquid crystal medium has a Δε, at 1 kHz and 20° C., of 8 to 14.

16. The liquid crystal medium according to claim 15, further comprising one or more compounds selected from the group consisting of compounds of formulae II-1g and III

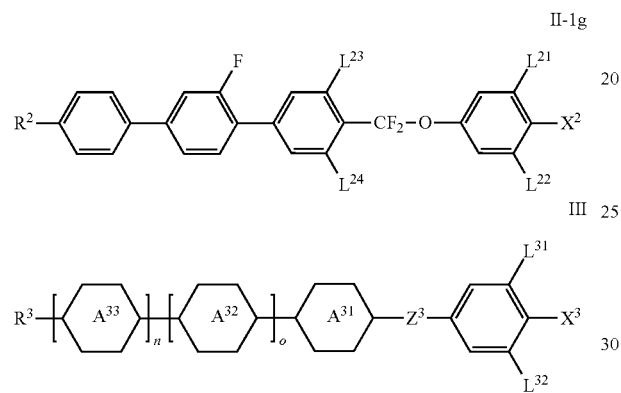

wherein
R² and R³ are, independently of each other, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

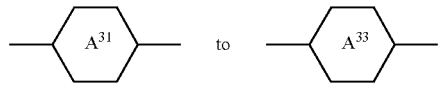

are, independently of each other,

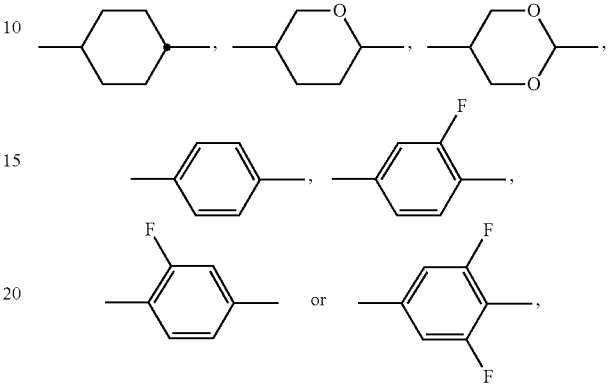

$L^{21}$, $L^{22}$, $L^{23}$, $L^{24}$, $L^{31}$ and $L^{32}$ are, independently of each other, H or F,
X² and X³ are, independently of each other, halogen, halogenated alkyl or alkoxy with 1 to 3 C-atoms, or halogenated alkenyl or alkenyloxy with 2 or 3 C-atoms,
Z³ is —CH₂CH₂—, —CF₂CF₂—, —COO—, trans-CH=CH—, trans-CF=CF—, —CH₂O— or a single bond, and
n and o are, independently of each other, 0 or 1.

17. A liquid crystal display, comprising a liquid crystal medium according to claim 15.

18. The liquid crystal display according to claim 16, which is addressed by an active matrix.

* * * * *